United States Patent
Balakrishnan et al.

(10) Patent No.: US 11,928,326 B2
(45) Date of Patent: *Mar. 12, 2024

(54) ACTIVATING A CAMERA FUNCTION WITHIN A CONTENT MANAGEMENT APPLICATION

(71) Applicant: Dropbox, Inc., San Francisco, CA (US)

(72) Inventors: Ramesh Balakrishnan, San Francisco, CA (US); Christopher Lee, Oakland, CA (US); George Milton Underwood, Palo Alto, CA (US)

(73) Assignee: Dropbox, Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/047,965

(22) Filed: Oct. 19, 2022

(65) Prior Publication Data

US 2023/0067290 A1    Mar. 2, 2023

Related U.S. Application Data

(63) Continuation of application No. 16/667,318, filed on Oct. 29, 2019, now Pat. No. 11,494,070, which is a
(Continued)

(51) Int. Cl.
| | |
|---|---|
| *G06F 3/04855* | (2022.01) |
| *G06F 3/01* | (2006.01) |
| *G06F 3/04817* | (2022.01) |
| *G06F 3/0482* | (2013.01) |
| *G06F 3/0485* | (2022.01) |
| *G06F 3/0488* | (2022.01) |
| *G06F 3/04883* | (2022.01) |

(52) U.S. Cl.
CPC ........ *G06F 3/04855* (2013.01); *G06F 3/0482* (2013.01); *G06F 3/04883* (2013.01); *G06F 3/017* (2013.01); *G06F 3/04817* (2013.01); *G06F 3/0485* (2013.01); *G06F 3/0488* (2013.01)

(58) Field of Classification Search
CPC .............. G06F 3/0482; G06F 3/04855; G06F 3/04883; G06F 3/0488; G06F 3/04817; G06F 3/0485; G06F 3/017
See application file for complete search history.

(56) References Cited

U.S. PATENT DOCUMENTS

| | | |
|---|---|---|
| 5,673,401 A | 9/1997 | Volk et al. |
| 5,819,032 A | 10/1998 | De Vries et al. |
| (Continued) | | |

OTHER PUBLICATIONS

Non-Final Office Action from U.S. Appl. No. 17/362,451, dated Oct. 14, 2022, 11 pages.
(Continued)

*Primary Examiner* — Ting Z Lee
(74) *Attorney, Agent, or Firm* — Keller Preece PLLC

(57) ABSTRACT

One or more embodiments of the present disclosure include a content management system that allows a user to easily activate a camera while viewing digital content. For example, a content management system can provide a graphical user interface that includes a scroll element that allows a user to navigate through digital content. In addition, a user can interact with the scroll element to activate a camera. For instance, a user can activate a camera by scrolling the scroll element to and/or beyond a particular position.

20 Claims, 11 Drawing Sheets

Related U.S. Application Data continuation of application No. 15/801,301, filed on Nov. 1, 2017, now Pat. No. 10,496,266, which is a continuation of application No. 14/520,210, filed on Oct. 21, 2014, now Pat. No. 9,836,205.

(60) Provisional application No. 62/044,247, filed on Aug. 31, 2014, provisional application No. 61/945,819, filed on Feb. 27, 2014.

(56) References Cited

U.S. PATENT DOCUMENTS

| | | |
|---|---|---|
| 6,366,303 B1 | 4/2002 | Venolia et al. |
| 6,671,405 B1 | 12/2003 | Savakis et al. |
| 6,937,254 B2 | 8/2005 | Nishiyama et al. |
| 6,976,228 B2 | 12/2005 | Bernhardson |
| 7,437,005 B2 | 10/2008 | Drucker et al. |
| 7,587,683 B2 | 9/2009 | Ito et al. |
| 7,634,740 B2 | 12/2009 | Enomoto et al. |
| D622,729 S | 8/2010 | Oda et al. |
| 7,877,317 B2 | 1/2011 | Chow |
| 7,970,240 B1 | 6/2011 | Chao et al. |
| 8,237,712 B2 | 8/2012 | Fagans et al. |
| 8,249,397 B2 | 8/2012 | Wood et al. |
| 9,111,014 B1 | 8/2015 | Brown et al. |
| 9,372,829 B1 | 6/2016 | Rahmani et al. |
| 10,346,023 B2 | 7/2019 | Underwood, IV et al. |
| 2001/0043279 A1 | 11/2001 | Niikawa et al. |
| 2002/0063737 A1 | 5/2002 | Feig et al. |
| 2003/0076301 A1 | 4/2003 | Tsuk et al. |
| 2005/0210403 A1 | 9/2005 | Satanek |
| 2005/0289482 A1 | 12/2005 | Anthony et al. |
| 2006/0090141 A1 | 4/2006 | Loui et al. |
| 2006/0236262 A1 | 10/2006 | Bathiche et al. |
| 2007/0074109 A1 | 3/2007 | Nagahara et al. |
| 2007/0209025 A1 | 9/2007 | Jing et al. |
| 2008/0052945 A1 | 3/2008 | Matas et al. |
| 2008/0235205 A1 | 9/2008 | Fein et al. |
| 2009/0019031 A1 | 1/2009 | Krovitz et al. |
| 2009/0064029 A1 | 3/2009 | Corkran et al. |
| 2009/0171783 A1 | 7/2009 | Raju et al. |
| 2009/0254855 A1 | 10/2009 | Kretz et al. |
| 2009/0265334 A1 | 10/2009 | Narayanan et al. |
| 2010/0085306 A1 | 4/2010 | Wu et al. |
| 2010/0095239 A1 | 4/2010 | McCommons et al. |
| 2010/0229115 A1 | 9/2010 | Augustine et al. |
| 2010/0251165 A1 | 9/2010 | Williams et al. |
| 2011/0083167 A1 | 4/2011 | Carpenter et al. |
| 2011/0225549 A1 | 9/2011 | Kim et al. |
| 2011/0252357 A1 | 10/2011 | Chaudhri et al. |
| 2011/0265002 A1 | 10/2011 | Hong et al. |
| 2012/0042279 A1 | 2/2012 | Naderi |
| 2012/0084731 A1 | 4/2012 | Filman et al. |
| 2012/0110509 A1 | 5/2012 | Isozu et al. |
| 2012/0198386 A1 | 8/2012 | Hautala et al. |
| 2013/0016113 A1 | 1/2013 | Adhikari et al. |
| 2013/0176256 A1 | 7/2013 | Hara et al. |
| 2013/0179837 A1 | 7/2013 | Eriksson et al. |
| 2013/0222431 A1 | 8/2013 | Joo et al. |
| 2013/0318476 A1 | 11/2013 | Sauve et al. |
| 2013/0332068 A1 | 12/2013 | Kesar et al. |
| 2014/0013271 A1 | 1/2014 | Moore et al. |
| 2014/0123005 A1 | 5/2014 | Forstall et al. |
| 2014/0125856 A1 | 5/2014 | Kim et al. |
| 2014/0149936 A1 | 5/2014 | Wilder et al. |
| 2014/0152585 A1* | 6/2014 | Andersson Reimer ............ G06F 3/0485 345/173 |
| 2014/0282099 A1 | 9/2014 | Bronder et al. |
| 2014/0337791 A1 | 11/2014 | Agnetta et al. |
| 2014/0344750 A1 | 11/2014 | Takahashi et al. |
| 2015/0019545 A1 | 1/2015 | Chedeau et al. |
| 2015/0039616 A1 | 2/2015 | Rolston et al. |
| 2015/0058708 A1 | 2/2015 | Georgiev |
| 2015/0058754 A1* | 2/2015 | Rauh ............ H04N 1/00 715/753 |
| 2015/0062097 A1 | 3/2015 | Chung et al. |
| 2015/0161205 A1 | 6/2015 | Beach et al. |
| 2015/0212666 A1 | 7/2015 | Daniel et al. |
| 2015/0242110 A1 | 8/2015 | Balakrishnan et al. |
| 2015/0242404 A1 | 8/2015 | Underwood, IV et al. |
| 2018/0059926 A1 | 3/2018 | Balakrishnan et al. |

OTHER PUBLICATIONS

Final Office Action from U.S. Appl. No. 16/119,858, dated Jul. 28, 2020, 12 pages.
Final Office Action from U.S. Appl. No. 16/425,627, dated May 3, 2021, 18 pages.
Non-Final Office Action from U.S. Appl. No. 16/119,858, dated Apr. 13, 2020, 13 pages.
Non-Final Office Action from U.S. Appl. No. 16/119,858, dated Jan. 26, 2021, 10 pages.
Non-Final Office Action from U.S. Appl. No. 16/425,627, dated Nov. 25, 2020, 21 pages.
Non-Final Office Action from U.S. Appl. No. 16/667,318, dated Mar. 2, 2022, 23 pages.
Notice of Allowance for U.S. Appl. No. 14/248,235 dated Feb. 25, 2019, 11 pages.
Notice of Allowance from U.S. Appl. No. 14/580,189, dated Sep. 30, 2019, 10 pages.
Notice of Allowance from U.S. Appl. No. 16/119,858, dated Mar. 24, 2021, 7 pages.
Notice of Allowance from U.S. Appl. No. 16/425,627, dated Sep. 8, 2021, 9 pages.
Notice of Allowance for U.S. Appl. No. 14/248,238 dated May 31, 2018, 17 pages.
Notice of Allowance for U.S. Appl. No. 14/520,210 dated Aug. 1, 2017, 14 pages.
Notice Of Allowance for U.S. Appl. No. 15/801,301 dated Aug. 7, 2019, 10 pages.
Notice of Allowance from U.S. Appl. No. 16/667,318, dated Jul. 6, 2022, 8 pages.
Notice of Allowance from U.S. Appl. No. 16/667,318, dated Jul. 26, 2022, 2 pages.
Office Action for U.S. Appl. No. 14/248,235 dated Apr. 25, 2017, 17 pages.
Office Action for U.S. Appl. No. 14/248,235 dated Mar. 7, 2018, 21 pages.
Office Action for U.S. Appl. No. 14/248,235 dated May 9, 2016, 12 pages.
Office Action for U.S. Appl. No. 14/248,235 dated Oct. 23, 2017, 21 pages.
Office Action for U.S. Appl. No. 14/248,235 dated Oct. 25, 2018, 18 pages.
Office Action for U.S. Appl. No. 14/248,235 dated Oct. 6, 2016, 13 pages.
Office Action for U.S. Appl. No. 14/248,238 dated Feb. 1, 2018, 27 pages.
Office Action for U.S. Appl. No. 14/248,238 dated Feb. 17, 2017, 16 pages.
Office Action for U.S. Appl. No. 14/248,238 dated Jun. 13, 2016, 23 pages.
Office Action for U.S. Appl. No. 14/248,238 dated Jun. 6, 2017, 19 pages.
Office Action for U.S. Appl. No. 14/248,238 dated Oct. 10, 2017, 21 pages.
Office Action for U.S. Appl. No. 14/248,238 dated Oct. 25, 2016, 16 pages.
Office Action for U.S. Appl. No. 14/520,210 dated Feb. 9, 2017, 11 pages.
Office Action for U.S. Appl. No. 15/801,301 dated Apr. 18, 2019, 32 pages.
Office Action from U.S. Appl. No. 17/362,451, dated Apr. 27, 2023, 12 pages.

* cited by examiner

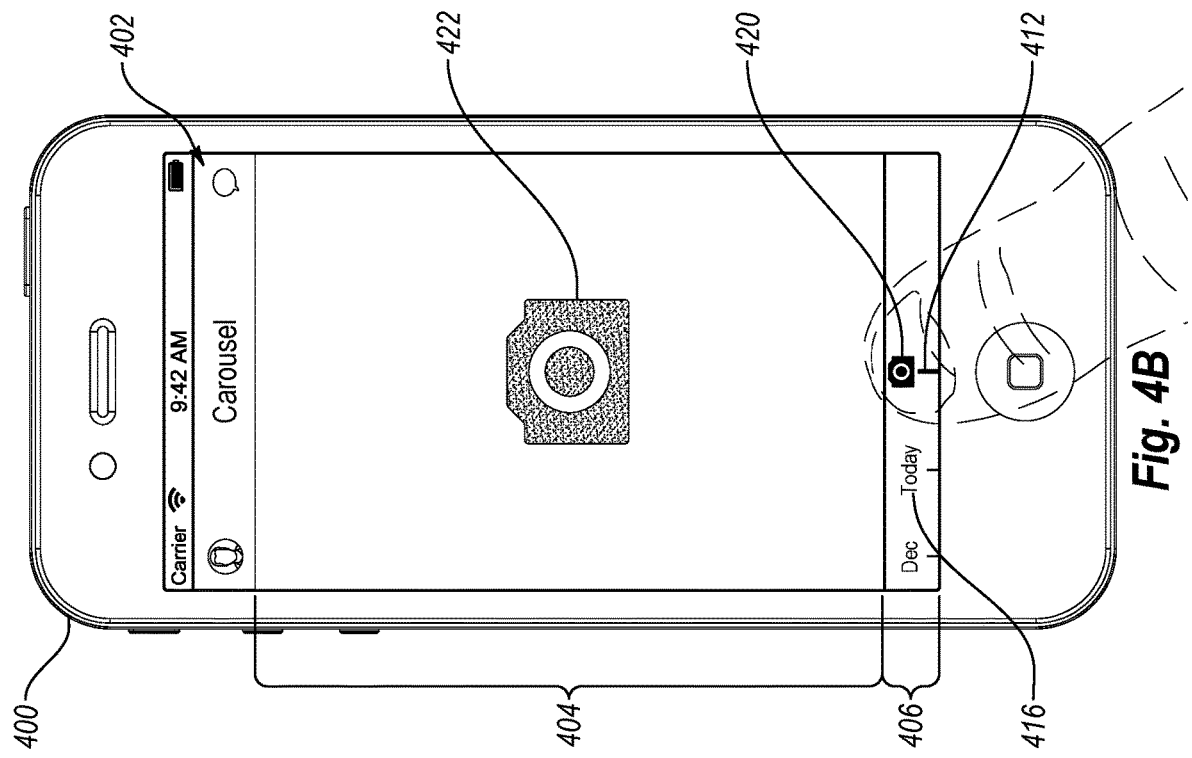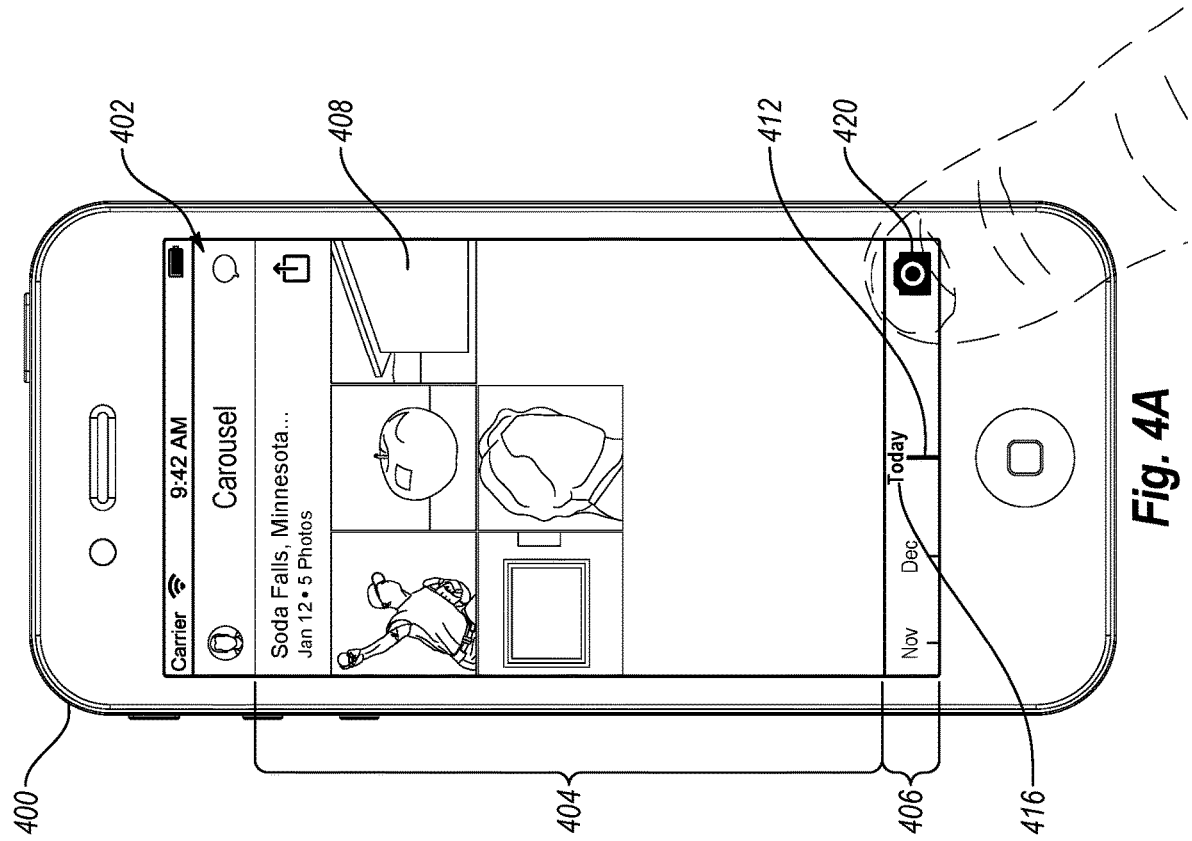

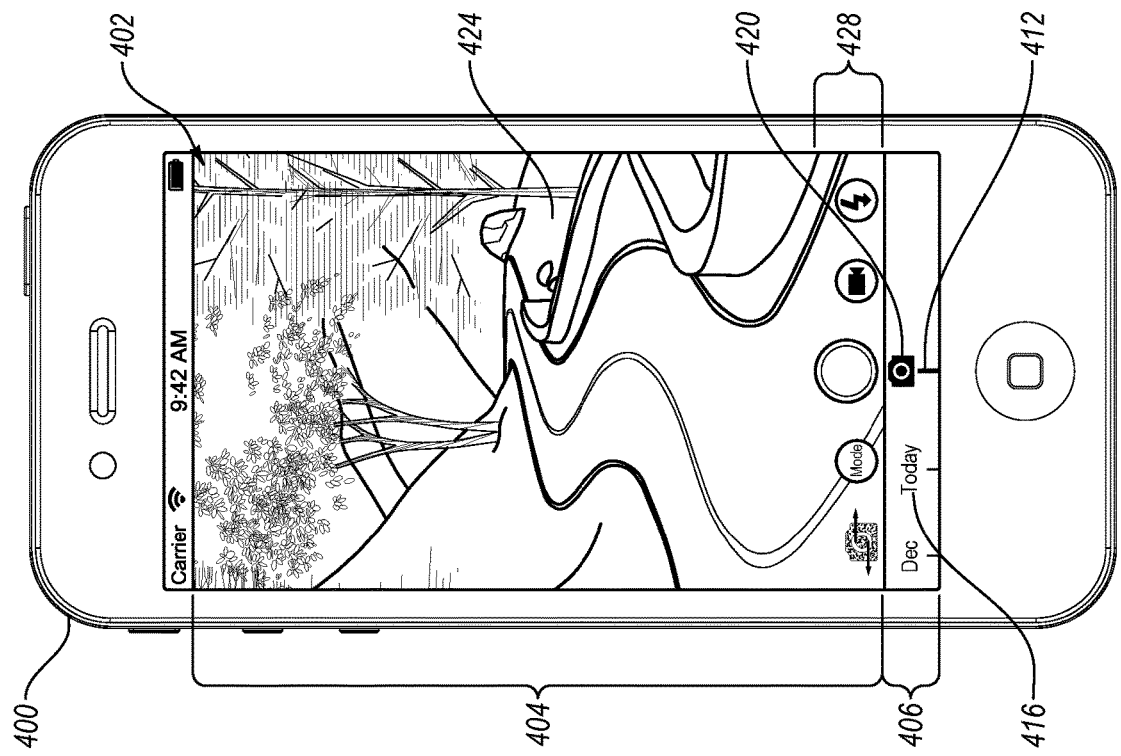
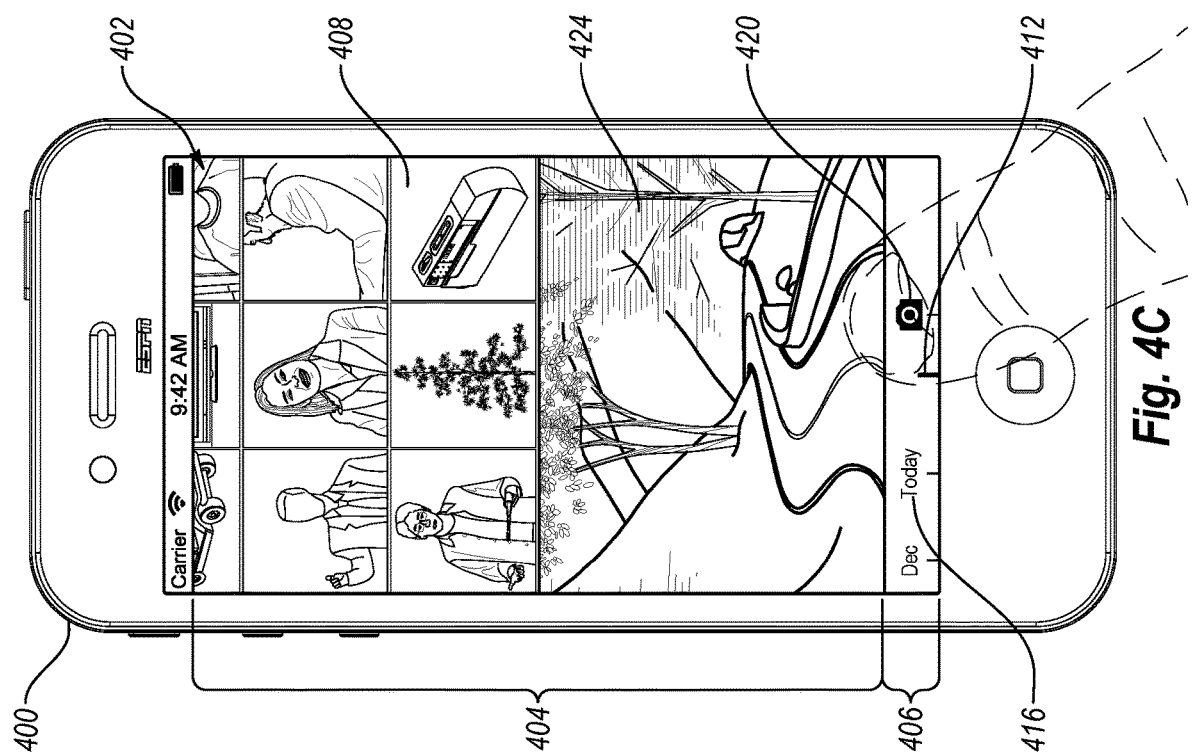
Fig. 4D
Fig. 4C

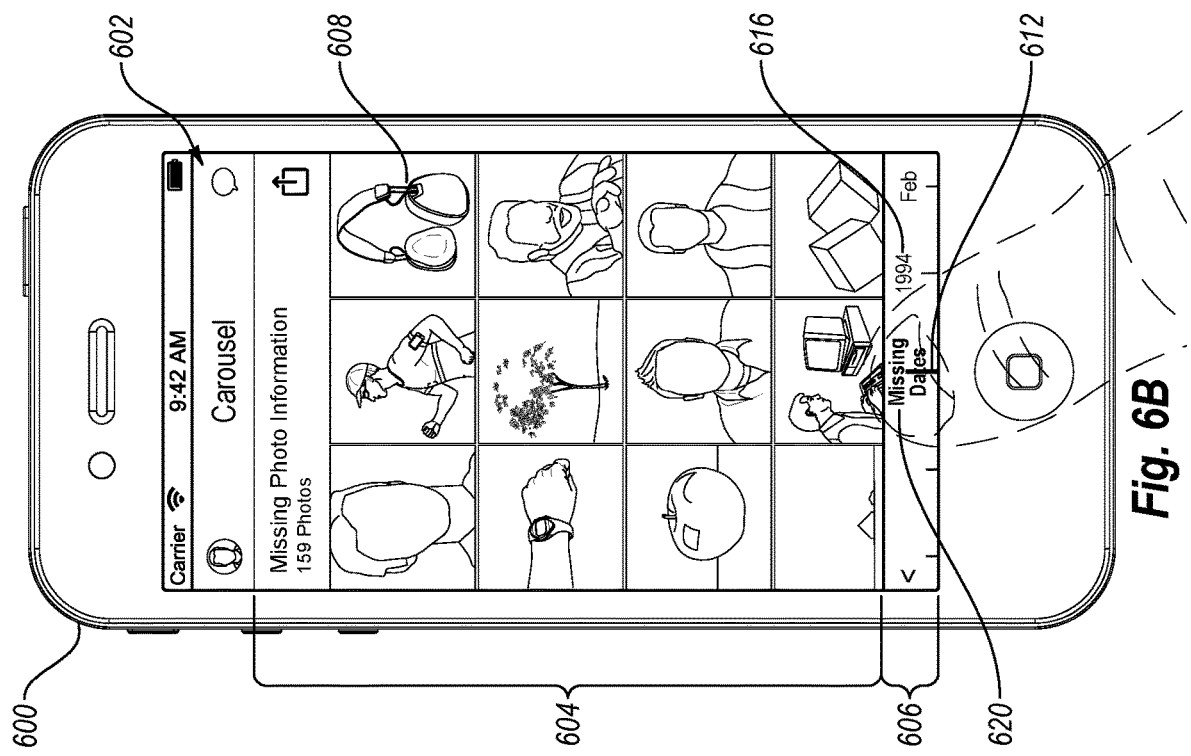
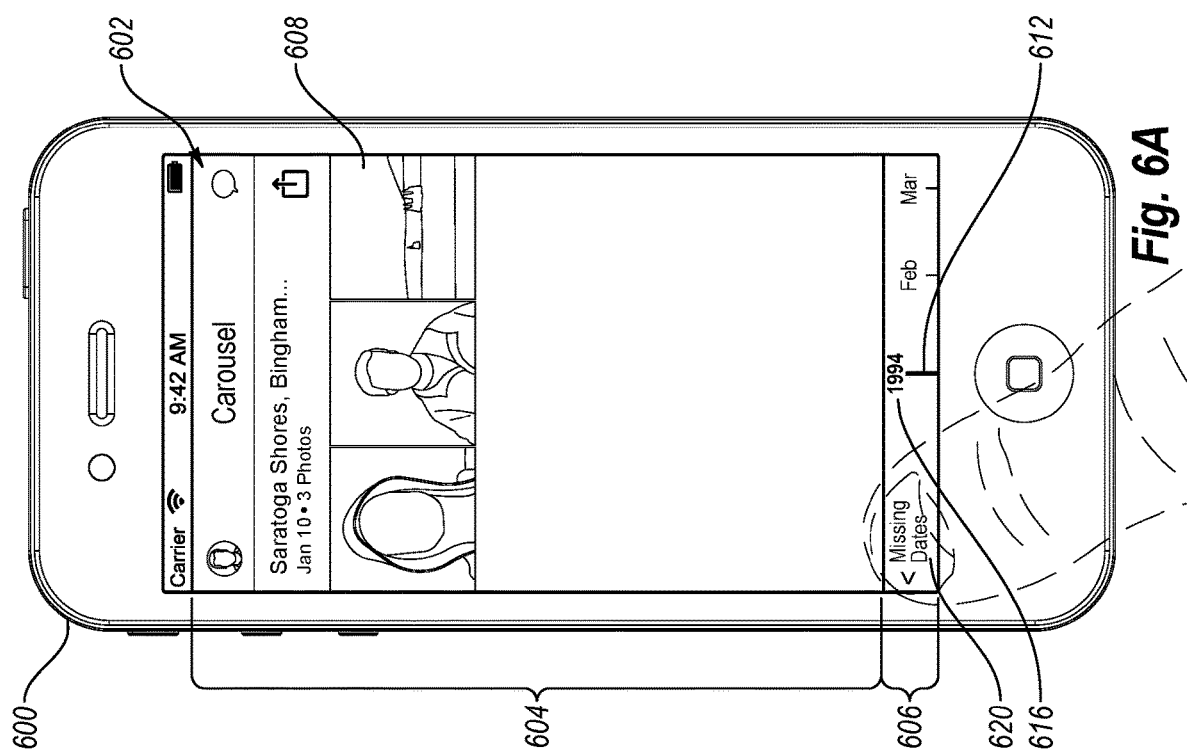
Fig. 6A
Fig. 6B

ACTIVATING A CAMERA FUNCTION WITHIN A CONTENT MANAGEMENT APPLICATION

CROSS REFERENCE TO RELATED APPLICATIONS

This application is a continuation of U.S. application Ser. No. 16/667,318, filed Oct. 29, 2019, which is a continuation of U.S. application Ser. No. 15/801,301, filed Nov. 1, 2017, which issued as U.S. Pat. No. 10,496,266, which is a continuation of U.S. application Ser. No. 14/520,210, filed Oct. 21, 2014, which issued as U.S. Pat. No. 9,836,205, which claims the benefit of and priority to U.S. Provisional Application No. 62/044,247, filed Aug. 31, 2014 and U.S. Provisional Application No. 61/945,819, filed Feb. 27, 2014. The entire contents of the foregoing applications are hereby incorporated by reference in their entireties.

BACKGROUND

1. Technical Field

One or more embodiments of the present disclosure relate generally to systems and methods for managing digital content. More specifically, one or more embodiments of the present disclosure relate to systems and methods of providing a graphical user interface that allows a user to capture and interact with digital content.

2. Background and Relevant Art

Computing devices (e.g., computers, tablets, smart phones) provide numerous ways for people to capture, create, share, view, and otherwise interact with numerous types of digital content. For example, computing devices allow users to interact with digital photos by capturing, sharing, and viewing digital photos. To facilitate user interaction with digital content, conventional digital content presentation applications may include user interfaces to present digital content to a user in a variety of presentation styles and formats. Regardless of presentation style and format, however, conventional digital content presentation applications have several disadvantages and drawbacks.

For example, most conventional digital content presentation applications are often incorporated in stand-alone applications. Due to the stand-alone nature of conventional applications, a user wishing to access another application while viewing digital content typically has to perform several steps. For example, with conventional applications, the user typically has to exit the digital content presentation application (or at least remove focus from the digital content presentation application), locate the other application, and open the other application. The process of exiting, locating, and opening an application can be inefficient and is often frustrating to the user.

For instance, a user viewing digital content in a conventional digital content presentation application on a handheld device may recognize a unique photo opportunity. Wishing to take a digital photo using the handheld device, the user typically would first exit the conventional digital content presentation application, for example, by pressing a home or back button on the handheld device. Next, the user may have to navigate through one or more screens on the handheld device to locate the camera application icon. Finally, the user may select the camera application icon to open the camera application. Even when the user is familiar with the navigation functions of the handheld device, the process to open the camera application may take several seconds, and the unique photo opportunity may no longer exist, thereby frustrating the user.

Some conventional digital content presentation applications attempt to solve the above problem by providing a plurality of selectable options within the graphical user interface of the digital content presentation application. For example, some graphical user interfaces associated with conventional digital content presentation applications, include several selectable buttons that allow a user to perform one or more actions.

Unfortunately, the numerous buttons included within many conventional graphical user interfaces create significant user interface clutter that diminishes and complicates the user experience. For example, the buttons can visually interfere with the user viewing digital content as well as create an interface that is aesthetically unappealing. In addition, due to the excessive buttons, a user may unintentionally interact with one of the buttons, which in turn performs an unintended function that causes user frustration. Moreover, displaying numerous buttons often leads to an unintuitive user experience because users are confused by the multitude of options presented simultaneously.

Additionally, conventional digital content presentation applications may have other disadvantages. For example, many conventional digital content presentation applications have a singular design, meaning, the entire purpose of conventional digital content presentation applications is to view digital content. For instance, conventional digital content presentation applications do not incentivize additional user interaction. For example, most conventional digital content presentation applications simply allow a user to view digital content. Thus, many digital content presentation applications are limited in design and result in a mundane user experience.

Accordingly, there is a need for systems and devices that provide a user with an enjoyable user experience when navigating through digital content.

SUMMARY

The principles described herein provide benefits and/or solve one or more of the foregoing or other disadvantages in the art with methods and systems for activating a camera of a computing device while viewing digital content. In particular, one or more embodiments provide a graphical user interface that, when presented on a handheld device, allows a user to easily activate a camera of the handheld device using a single hand holding the handheld device. For example, in one or more embodiments the graphical user interface includes an interactive scroll element with which a user can interact to scroll digital content through a view area of the graphical user interface. In addition, a user can scroll the scroll element to an end position at which a user can provide an additional user interaction to activate the camera of the handheld device.

Additionally, one or more embodiments provide a graphical user interface that allow a user to easily and efficiently activate a camera function while minimizing clutter on a graphical user interface. In particular, one or more embodiments include a scroll function that allows a user to scroll digital content through a view area of the graphical user interface. The scroll function can incorporate a camera activation function that provides a seamless activation of the camera. For example, a user can activate the camera function for a handheld device by simply using the scroll function to scroll to a particular position. Thus, the graphical user interface allows the user to activate a camera without the need for any additional interactive graphical elements that clutter the graphical user interface.

Additional features and advantages of the present invention will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features of the invention can be obtained, a more particular description of the invention briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings in which:

FIGS. 4A-4D illustrate a graphical user interface that allows a user to activate a function in accordance with one or more embodiments;

FIGS. 6A-6B illustrate another graphical user interface that allows a user to access content in accordance with one or more embodiments;

DETAILED DESCRIPTION

Figure 1:
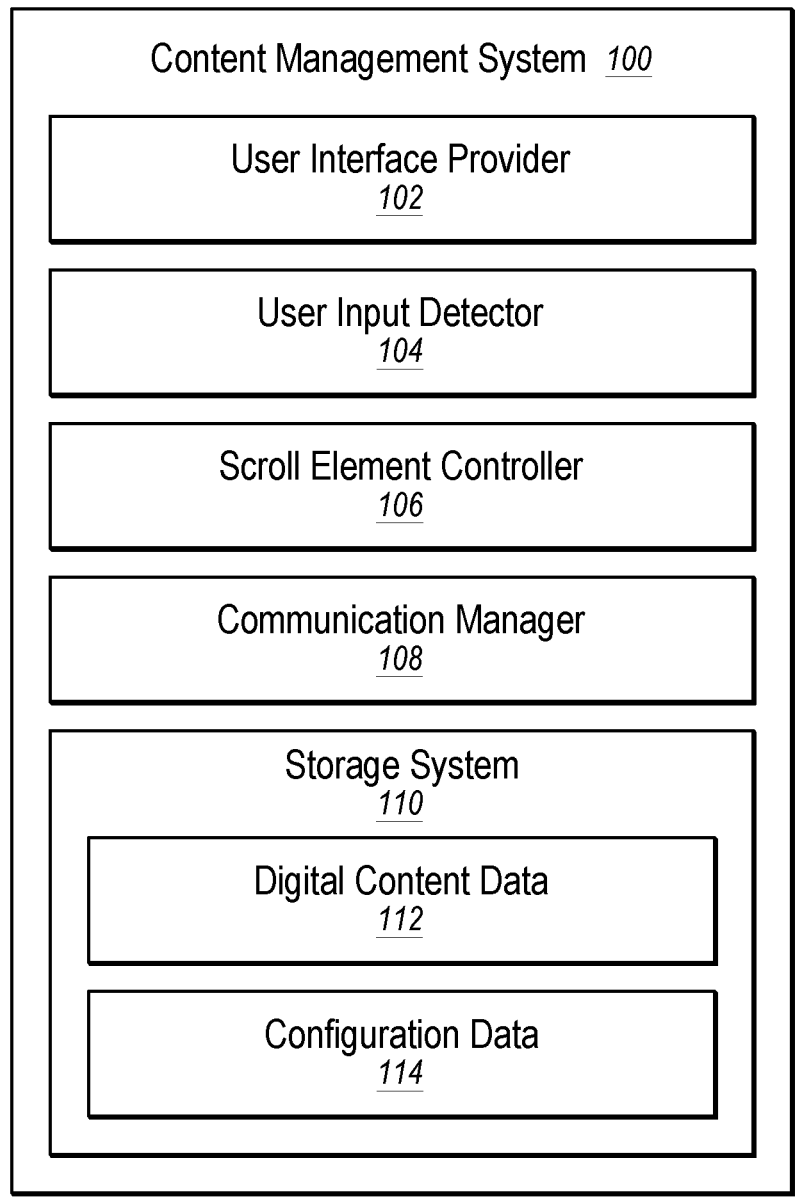
FIG. 1 illustrates a schematic diagram of a content management system in accordance with one or more embodiments.

One or more embodiments include a content management system that allows a user to easily activate a camera of a computing device while viewing digital content. For example, a content management system can provide a graphical user interface (or "user interface") including a scroll element that allows a user to quickly scroll through and view digital content. One or more embodiments provide a user interface that allows a user to activate a camera using the same interactive elements as used to scroll through and view digital content. To illustrate, an example user interface includes an interactive scroll element with which a user can interact to scroll through digital content as well as activate a camera. For instance, a user can activate a camera by scrolling a scroll element to a particular position or by providing a particular touch input by way of the scroll element.

Additionally, one or more embodiments of a content management system provide a user interface that allows a user to quickly and easily transition between viewing digital content and capturing a digital photo. For example, a content management system can provide a user interface that allows a user to activate a camera of a handheld device by scrolling to a particular position within digital content. For instance, a user can scroll to an end position of digital content to cause a content management system to activate a camera. Upon activating a camera, a content management system can present a camera viewfinder to allow a user to capture a digital photo. While a camera is activated, a user can provide another user interaction that causes a content management system to deactivate the camera and return to presenting digital content.

As mentioned above, a user interface can include a scrolling function that allows a user to scroll digital content through a view area. While viewing digital content, a user may recognize a photo opportunity. From within the graphical user interface, a user can interact with a scrolling function to activate a camera in an efficient and quick manner. In particular, a user can activate a camera by using a scrolling function to scroll to a particular position that activates a camera. Thus, a user can transition between viewing digital content to capturing a new digital photo within a minimal amount of time and by providing a minimum number of user interactions.

In addition, and as inferred above, one or more embodiments of the content management system can provide an intuitive user interface that allows a user to browse and experience digital content in an enjoyable manner as well as activate a camera without increasing user interface clutter. For example, the user interface can include a scroll element having various navigational functions. The navigational functions of the scroll element allow a user to intuitively understand how to navigate and browse digital content. In addition, the same scroll element allows a user to activate a camera. In particular, a user can activate a camera by providing the same type of user interaction needed to navigate and browse digital content. Thus, the content management system minimizes the types of user interactions the user needs to know, as well as the number of interactive elements within the user interface.

In addition to the various navigation and browsing functions generally described above, a content management system can also provide a digital content presentation application that is interactive and encourages users to build a digital content collection. In particular, one or more embodiments of a content management system can have a dual function of presenting previously captured or stored digital content, while also prompting the user to use a camera to capture additional digital content. For example, in one or more embodiments, upon a user navigating to an end of digital content, a user interface can present an option to activate a camera, thus prompting the user to add to the user's digital content.

As used herein, "digital content" refers to digital data, such as a data file. Examples of digital content include, but are not limited to, digital photos, digital video, digital audio, document files of all types, streaming content, contact lists, webpages, and/or folders that include digital content.

FIG. 1 illustrates an example embodiment of a content management system 100 (or simply "system 100"). As shown, system 100 may include, but is not limited to, user interface provider 102, user input detector 104, scroll element controller 106, communication manager 108, and storage system 110. Each of the components 102-110 of system 100 may be in communication with one another using any suitable communication technologies. It will be recognized that although components 102-110 are shown to be separate in FIG. 1, any of components 102-110 may be combined into fewer components, such as into a single component, or divided into more components as may serve a particular embodiment. In addition, components 102-110 may be located on, or implemented by, one or more computing devices, for example, a handheld device, tablet, laptop computer, or desktop computer, or other computing devices as described below in relation to FIG. 9. In addition, one or more portions of system 100 (e.g., storage system 110) can be located on one or more server devices that form online content management system 1002, such as described below in reference to FIG. 10.

Each of components 102-110 can comprise software, hardware, or both. For example, each of components 102-110 can comprise one or more instructions stored on a computer-readable storage medium and one or more processors of one or more computing devices to execute the instructions. When executed by the one or more processors, the computer-executable instructions cause a computing device to perform the methods described herein. Alternatively, components 102-110 can comprise hardware, such as a special purpose processing device to perform a certain function or group of functions.

As mentioned above, and as shown in FIG. 1, system 100 can include user interface provider 102. User interface provider 102 can provide a graphical user interface (or simply "user interface") that allows a user to navigate, browse, view, share, manage, and/or otherwise experience digital content using system 100. For example, user interface provider 102 can provide a user interface that facilitates a presentation of digital content on a computing device. Likewise, user interface provider 102 can provide a user interface that facilitates scrolling through digital content. In addition, and as mentioned above, user interface provider 102 can provide a user interface that allows a user to easily and quickly activate one or more functions from within the user interface. For example, user interface provider 102 can provide a user interface that allows a user to activate a camera function of a computing device from within the user interface.

More specifically, user interface provider 102 may provide (e.g., by way of a display screen associated with a computing device) a variety of interactive elements within the user interface. For example, user interface provider 102 can cause a computing device to present one or more graphical objects that represent digital content. For instance, in one or more embodiments, user interface provider 102 can present reduced-size versions of digital content, such as thumbnails or icons of digital photos. In some embodiments, user interface provider 102 can present reduced-size versions of digital content in a grid format within a view area of a user interface, as described below in relation to FIGS. 2-3. Alternatively, user interface provider 102 may facilitate presentation of other types of digital content (e.g., audio, videos, webpages, documents), depending on the particular application of system 100.

In addition, user interface provider 102 can cause a computing device to present one or more interactive elements that enable navigation and browsing of digital content within a view area of a user interface. In one or more example embodiments, user interface provider 102 can cause a computing device to present a scroll element with which a user can interact. In particular, a user can interact with a scroll element to scroll or otherwise move digital content through a view area within a user interface. User interface provider 102 can provide one or more features on a scroll element that enhances the user's ability to scroll through or otherwise experience digital content. For example, user interface provider 102 can provide markers and/or labels on a scroll element that correspond to digital content attributes (e.g., dates associated with digital photos).

In addition to features that enhance scrolling through digital content, user interface provider 102 can further provide a scroll element to present one or more graphical objects related to an activation function within the scroll element. In particular, interface provider 102 can cause a scroll element to include one or more function symbols that indicate that a scroll element can activate a function on the computing device. As used herein, a "function" can include any action that uses the computing device. For example, a function can include executing software, activating hardware, accessing content, or a combination thereof. For example, interface provider 102 can provide a camera symbol within a scroll element that indicates to a user that providing one or more interactions to a scroll element will activate a camera of the computing device. Therefore, a user can interact with a scroll element to not only scroll through digital content, but also to activate a camera of the computing device quickly and easily.

In addition to providing one or more function symbols in relation to a scroll element, user interface provider 102 can also cause a computing device to present one or more function symbols within a view area of a user interface. The function symbols can indicate to a user that providing one or more user interactions with respect to a view area can activate a function on the computing device. In some embodiments, user interface provider 102 can provide a camera symbol within a view area of a user interface that intuitively directs a user to provide one or more user interactions to activate a camera for a computing device. In addition to the above, user interface provider 102 can provide various other elements and features as part of a user interface, as will be described in more detail below.

As further illustrated in FIG. 1, system 100 can include user input detector 104. In one or more embodiments, user input detector 104 can detect, identify, and/or receive, a user interaction and translate a user interaction into a user input (e.g., a user command or request). As referred to herein, a "user interaction" means a single interaction, or combination of interactions, received from a user by way of one or more input devices. In some embodiments, user input detector 104 can translate a combination of user interactions as a single user input and/or translate a single user interaction into multiple user inputs.

For example, user input detector 104 can detect a user interaction from a keyboard, mouse, touch screen, or any other input device. In the event a touch screen is used as an input device, user input detector 104 can detect one or more touch gestures (e.g., swipe gestures, tap gestures, pinch gestures, or reverse pinch gestures) that a user provides to the touch screen. In one or more embodiments, the user can provide one or more touch gestures in relation to and/or directed at one or more graphical objects, items, or elements of a user interface presented on a touch screen. User input detector 104 may additionally, or alternatively, receive data representative of a user interaction. For example, user input detector 104 can receive one or more user configurable parameters from a user, one or more user commands from the user, and/or any other suitable user input.

System 100 can use user input and/or other data received from user input detector 104 to manage, control, and/or facilitate the use of a user interface. In general, in response to user input detector 104 detecting one or more user interactions, system 100 allows a user to view, search, edit, share, and/or otherwise experience digital content within a user-friendly and intuitive user interface. For example, in response to user input detector 104 detecting one or more touch gestures, system 100 allows a user to navigate through digital content.

Moreover, in response to the user input detector 104 detecting a user interaction with respect to one or more interactive elements of a user interface, system 100 can perform one or more operations. For example, upon user input detector 104 detecting one or more touch gestures with respect to a scroll element, system 100 may scroll digital content through a view area of a user interface. Additionally, in response to one or more touch gestures with respect to a scroll element, system 100 may activate a function of a computing device, as will be explained in more detail below.

FIG. 1 further illustrates that system 100 can include scroll element controller 106. In one or more embodiments, scroll element controller 106 controls and manages functions associated with a scroll element. For example, based on user input detector 104 detecting a user interaction relative to a scroll element, scroll element controller 106 can control navigation or other movement of digital content relative to a view area of a user interface.

In particular, scroll element controller 106 can control the scrolling of digital content using a variety of techniques. In one or more embodiments, scroll element controller 106 can control the rate at which navigation through digital content occurs. In addition, scroll element controller 106 can control a direction of digital content scrolling. For example, with respect to a horizontal scroll element, scroll element controller 106 can control vertical scrolling of a vertical grid of digital content. In particular, scroll element controller 106 can translate a horizontal user interaction (e.g., a side-to-side swipe touch gesture) into a vertical movement of digital content through a view area. Thus, for example, when user input detector 104 detects a horizontal gesture with respect to a scroll element, scroll element controller 106 translates the horizontal gesture into movement of a vertical grid of digital content through a view area.

Alternatively, scroll element controller 106 can translate a horizontal user interaction into a horizontal movement, a vertical user interaction into a horizontal movement, or a vertical user interaction into a vertical movement. In no way is scroll element controller 106 limited to only vertical and horizontal embodiments, and in one or more alternative embodiments scroll element controller 106 can translate any direction of a user interaction into the same direction, or any other direction, of movement of digital content.

In addition to controlling the various scrolling functions of a scroll element, scroll element controller 106 can facilitate activation by a user of one or more functions by way of a scroll element. For example, in response to user input detector 104 detecting one or more user interactions with respect to a scroll element, scroll element controller 106 can activate a camera function of a computing device. To do so, scroll element controller 106 can detect a first position of the scroll element from which the user can activate a function of a computing device. In one or more embodiments, the first position of the scroll element is an end position that corresponds to an end portion of digital content. In response to a combination of detecting the first position of the scroll element and receiving a user input with respect to the first position, scroll element controller 106 may activate a camera of a computing device.

Additionally, in some embodiments, upon activating a function of a computing device, scroll element controller 106 can cause a scroll element to scroll or move to a second position. For example, a second position of a scroll element can indicate that a particular function is currently activated. In some embodiments, a second position of a scroll element is a position that is past an end of a scroll element that corresponds to an end portion of digital content. Additional details and examples of activating a camera function, or other function, of a computing device will be described below with reference to FIGS. 3-5.

As mentioned above, and as illustrated in FIG. 1, system 100 may further include communication manager 108. Communication manager 108 can facilitate receiving and sending data to and from system 100. In particular, communication manager 108 can facilitate sending and receiving digital content. For example, communication manager 108 can package or format digital content to be sent to or process digital content received by system 100 in any necessary form that is able to be sent through one or more communication channels and using an appropriate communication protocol, as described further below with reference to FIG. 9.

As discussed above, system 100 can also include storage system 110, as illustrated in FIG. 1. Storage system 110 may maintain digital content data 112 representative of digital content and associated information. For example, digital content data 112 can include digital content files, metadata associated with digital content, reduced-sized versions of digital content, and/or other similar type data that system 100 may use in connection with presenting digital content by way of a user interface.

Storage system 110 may also maintain configuration data 114 representative of information used to configure one or more features, functions and/or elements of system 100. For example, configuration data 114 may include user settings/preferences, user account information, and other similar types of configuration data. For instance, a user can set one or more preferences with respect to one or more functions or features related to a scroll element. In some embodiments, for example, a user can select a function to activate using a scroll element. In addition, a user can select or customize how different user interactions control various functions of system 100.

As will be described in more detail below, each of components 102-110 of system 100 can be used alone and/or in combination to provide a user interface that allows a user to scroll through digital content and quickly activate a function directly from the user interface. In particular, FIGS. 2-6B and the description that follows illustrate various example embodiments of the principles of system 100 described above.

Figure 2:
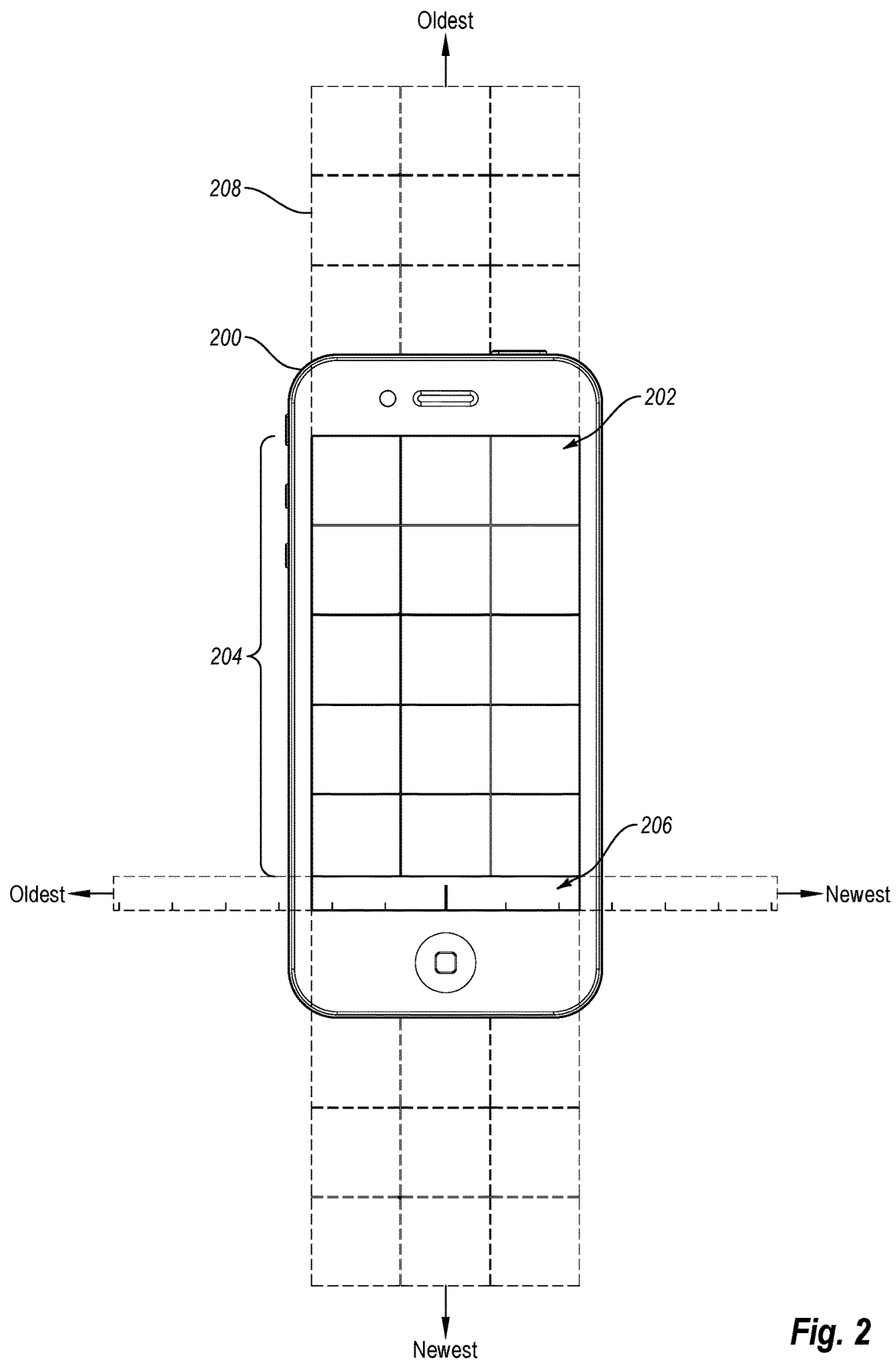
FIG. 2 illustrates a concept diagram of a graphical user interface for managing digital content in accordance with one or more embodiments.

As mentioned above, a computing device can partially or entirely implement system 100. For example, FIG. 2 illustrates a mobile computing device 200 that may implement one or more of components 102-110. As illustrated in FIG. 2, computing device 200 is a handheld device, such as a mobile phone device (e.g., a smartphone). As used herein, the term "handheld device" refers to device sized and geometrically configured to be held/operated in a single hand of a user. In additional or alternative examples, however, system 100 may be implemented by any other suitable computing device, such as, but not limited to, a tablet device, a laptop or desktop computer, a personal-digital assistant device, and/or any other suitable computing device configured to perform one or more of the processes and/or operations described herein.

As illustrated in FIG. 2, computing device 200 may include and/or be associated with touch screen 202 that can be used to display a user interface and detect user interactions. Additionally or alternatively, computing device 200 may include any other suitable input device (e.g., a keypad, one or more input buttons). As illustrated in FIG. 2, touch screen 202 can present a user interface that includes view area 204 and scroll element 206. In general, view area 204 is a portion of the user interface that facilitates a presentation of digital content and scroll element 206 facilitates navigation of digital content within view area 104.

As illustrated in FIG. 2, view area 204 can be used to present digital content using a grid 208 format. For example, user interface provider 102 can arrange grid 208 into a vertical configuration. Grid 208 can include a plurality of grid units, each of which can include a separate instance of digital content (e.g., a digital photo). As further illustrated in FIG. 2, user interface provider 102 can arrange grid 208 to represent a timeline of digital content. For example, in the event that the digital content includes digital photos, user interface provider 102 can organize the oldest digital photos toward the top of grid 208, and organize the newest digital photos toward the bottom of the grid 208. Thus, a user can scroll though digital content in a timeline manner by moving grid 208 vertically through view area 204, as indicated by the vertical arrows shown in FIG. 2. In some embodiments, a user can provide one or more user interactions to view area 204 (e.g., one or more vertical swipe gestures) to scroll through digital content within grid 208.

In addition, and as illustrated in FIG. 2, the user interface can include scroll element 206. In one or more embodiments, scroll element 206 can facilitate scrolling digital content through view area 204. In particular, the size of scroll element 206 can proportionally correspond to the size of grid 208. In particular, a left end of scroll element 206 can correspond with a top of grid 208. Likewise, a right end of scroll element 206 can correspond with a bottom of grid 208. Moreover, an area or distance between the left end and the right end of scroll element 206 corresponds to an associated area or distance between the top and bottom of grid 208.

FIG. 2 also illustrates that user interface provider 102 can position scroll element 206 proximate to, or directly at, the bottom of touch screen 202. In addition, FIG. 2 shows that user interface provider 102 can orient scroll element 206 in a horizontal orientation. The position and orientation of scroll element 206 shown in FIG. 2 call allow a user to easily navigate through digital content in grid 208 using only the user's thumb on the hand holding computing device 200. In alternative embodiments, the position and the orientation of scroll element 206 can vary. For example, a user may rotate computing device 200 ninety degrees. When rotated, the user interface provider 102 can provide a vertical scroll element located on a right side of touch screen 202.

Figure 3:
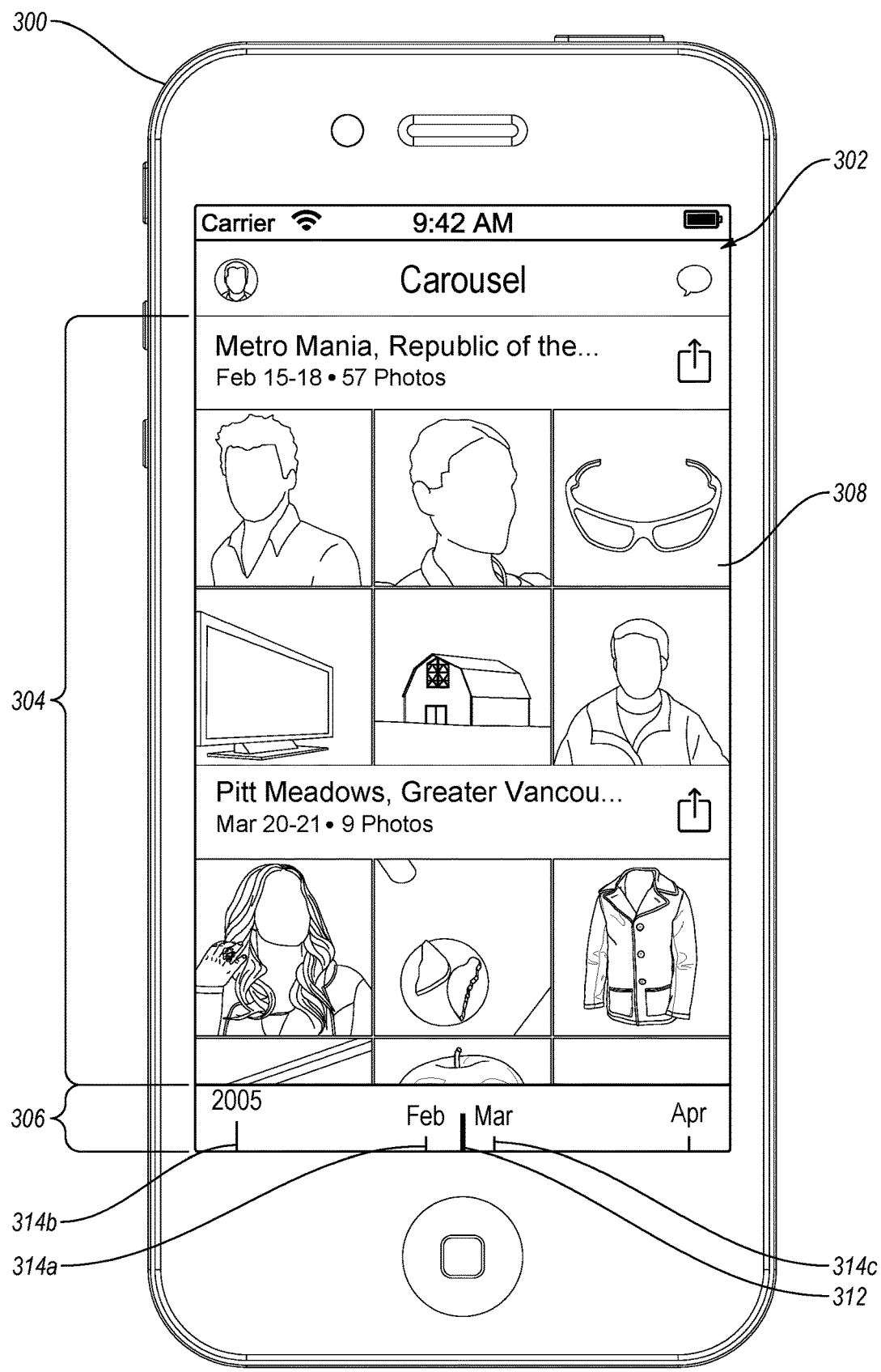
FIG. 3 illustrates a graphical user interface in accordance with one or more embodiments.

FIG. 3 illustrates additional details of an example user interface provided by system 100. For example, FIG. 3 shows another computing device 300 that includes a touch screen 302. Similar to FIG. 2, computing device 300 can display a user interface that includes a view area 304 that can present digital content 308. As illustrated in FIG. 3, user interface provider 102 can organize digital content 308 into one or more groups. For example, as shown in FIG. 3, digital content 308 is organized into groups based on dates associated with digital content 308. In alternative embodiments, user interface provider 102 can organize digital content 308 into groups based on types of digital content (e.g., documents, videos, audio, photos), people (e.g., people included in photos), events (e.g., vacation, graduation, wedding), or one or more user defined groups.

FIG. 3 also shows additional example features of a scroll element 306. For example, scroll element 306 can include indicator 312. In general, indicator 312 is statically positioned on scroll element 306 to indicate a scroll element position corresponding to digital content 308 presented in view area 304. Thus, as a user interacts with scroll element 306, scroll element 306 can move horizontally with respect to the statically positioned indicator 312. As illustrated, indicator 312 can appear to be bold in comparison to other markers (e.g., markers 314a-c) to visually set indicator 312 apart. In one or more embodiments, indicator 312 can be a different color, texture, or opacity compared to other markers on scroll element 306.

FIG. 3 further illustrates that scroll element 306 can include markers 314a-c that indicate dates or approximate dates that correspond to dates associated with digital content 308. For example, digital content 308 can be associated with a capture date (e.g., digital photo metadata that includes a date). Thus, markers 314a-c, along with additional markers within scroll element 306, can form a timeline feature on scroll element 306 that allows a user to easily locate digital content 308 associated with markers 314a-c.

For example, a user can provide a user interaction to scroll element 306 that causes scroll element 306 to scroll or otherwise move to align marker 314a with indicator 312 (e.g., a user can provide a horizontal swipe gesture to touch screen 302). As a user aligns marker 314a with indicator 312, user interface provider 102 can present digital content 308 corresponding to the date associated with marker 314a within view area 304 of the user interface. In particular, and as illustrated in FIG. 3, when marker 314a is substantially aligned with indicator 312, user interface provider 102 can present digital content associated with the date of marker 314a in view area 304.

The way in which a user can use the user interface to interact with digital content 308 can vary from one embodiment to the next. For example, a user can provide a horizontal swipe gesture relative to scroll element 306 to cause digital content 308 to vertically scroll or otherwise move through view area 304. For instance, a left-to-right swipe gesture to scroll element 306 can cause digital content 308 to scroll downward through view area 304. Likewise, a right-to-left swipe gesture can cause digital content 308 to scroll upward through view area 304. Thus, as a user provides side-to-side horizontal user interactions with respect to scroll element 306, digital content 308 scrolls vertically in either direction within view area 304, which allows a user to navigate and browse digital content 304 by using only the user's thumb to interact with scroll element 306.

In addition to providing user interactions with respect to scroll element 306, a user can provide one or more user interactions with respect to view area 304. For example, a user can provide one or more vertical swipe gestures within view area 304 to scroll or otherwise move digital content 308 through view area 304. For instance, an upward swipe gesture can cause digital content 308 to scroll upward through view area 304. In the same manner, a downward swipe gesture can cause digital content 308 to scroll downward through view area 304. In the event a user provides a vertical swipe gesture to view area 304, scroll element 306 can also scroll or otherwise move in relation to digital content 308, as explained in detail above. In some embodiments, the user interface does not include scroll element 306, in which case a user scrolls through digital content 308 exclusively by way of providing one or more touch gestures to view area 304.

FIGS. 4A-4D illustrate one or more additional features that can be included within a user interface provided by system 100. In particular, FIGS. 4A-4D illustrate various ways in which a user can activate a function of a computing device from within a user interface provided by system 100. Generally, and similar or the same as described previously with respect to FIGS. 2-3, FIGS. 4A-4D illustrate a computing device 400 that can implement one or more features of system 100. Computing device includes a touch screen 402 presenting a user interface having view area 404 and scroll element 406. A user can provide one or more user interactions directed at view area 404 and/or scroll element 406 to scroll or otherwise move digital content 408 through view area 404.

FIG. 4A shows that scroll element 406 is in a first position from which a user can activate a function (e.g., activate a camera of computing device 400). As illustrated in FIG. 4A, the first position can correspond with and end of scroll element 406, which can also corresponds with an end of digital content 408. For example, because the right end of scroll element 406 can represent the newest instance of digital content 408 (e.g., see FIG. 2), user interface provider 102 can associate the word "Today" with marker 416 corresponding to the right end of scroll element 406, and thus overlapping indicator 412. For instance, as applied to marker 416, the label "Today" can trump the date that would have otherwise been associated with the marker. In particular, user interface provider 102 can associate the label "Today" to marker 416 based on determining that marker 416 is the last marker on the right end of scroll element 406.

Alternatively, user interface provider 102 can provide a date label for marker 416 that is associated with digital content 408 corresponding to marker 416. In one or more embodiments, user interface provider 102 can determine if the date associated with the digital content 408 corresponding to marker 416 exceeds a time period threshold compared to the current date. For example, if the date associated with marker 416 is more than two weeks in the past from the current date, user interface provider 102 can label marker 416 with the date associated with the digital content 408 corresponding to marker 416. If, however, the date is less than two weeks in the past from the current date, user interface provider 102 can cause the "Today" label to trump the date.

The time period threshold can be any amount of time greater or less than two weeks. Alternatively, or in addition to the timer period threshold, user interface provider 102 can determine if the date associated with the digital content at the end of the collection is within the current month. If the date is within the current month, the "Today" label trumps the date associated with the digital content; however, if the date is outside the current month, user interface provider 102 can label the marker 416 with the date associated with digital content.

Regardless of the label applied to the marker 416 associated with a first position of scroll element 406, the location of a first position can vary from one embodiment to the next. For example, FIG. 4A illustrates a first position of scroll element 406 at the right end of scroll element 406. A first position of scroll element 406, however, can be located at various other positions. For example, a first position of scroll element 406 can be located at the left end of scroll element 406. Furthermore, in one or more embodiments, scroll element 406 can have a first position from which a user can access a function at both the right end and left end of scroll element 406, as will be discussed in additional detail below.

FIG. 4A further illustrates that when scroll element 406 is in a first position, interface provider 102 can provide function symbol 420 within scroll element 406. For example, as illustrated in FIG. 4A, function symbol 420 can represent a camera function of the computing device 400. In one or more alternative embodiments, the function symbol 420 can include any icon, graphical object, image, or text that indicates a function that a user can activate from within the user interface while scroll element 406 is in the first position.

In particular, and as illustrated in FIG. 4A, function symbol 420 can have a position within scroll element 406 that indicates to a user that an additional interaction with scroll element 406 can activate a function. For example, function symbol 420 can have a far right position within scroll element 406 when scroll element is located at the right end of scroll element 406, as illustrated in FIG. 4A. Likewise, function symbol 420 can have a far left position within scroll element 406 when scroll element 406 is at the left end of scroll element 406.

Using one or more of the above described features, FIGS. 4A and 4B illustrate an example embodiment of a user interface with which a user can interact to activate a camera function of computing device 400 using one or more components of system 100. For example, a user can provide one or more horizontal swipe gestures (e.g., one or more right-to-left swipe gestures) to move scroll element 406 to the right end of scroll element 406. Upon reaching the right end of scroll element 406, scroll element controller 106 can stop movement of scroll element 406 in a first position (as shown in FIG. 4A). For instance, scroll element 406 can continue to move in response to a user providing one or more horizontal swipe gestures until marker 416 aligns with indicator 412, at which point scroll element 406 stops moving.

User interface provider 102 can provide one or more effects upon scroll element 406 reaching the right end. For example, in some embodiments user interface provider 102 provides a hard stop effect when marker 416 aligns with indicator 412. Alternatively, the user interface provider 102 can provide a bounce effect when marker 416 aligns with indicator 412. A bounce effect, for example, can include marker 416 moving slightly past indicator 412 (e.g., slightly to the right of indicator 412) and then "bouncing" back to align with indicator 412. Additionally, a bounce effect may include one or more iterations where marker 416 moves slightly to the right of indicator 412, bounces back to move slightly to the left of indicator 412, and then aligns with indicator 412. In addition to various visual effects, system 100 can cause the computing device to provide a tactile or audible effect when scroll element 406 reaches the right end.

As mentioned above, when located at the right end position (e.g., a first position), user interface provider 102 includes function symbol 420 in scroll element 406, indicating to a user that a user can provide an additional user interaction to scroll element 406 to activate a function. For example, a user can provide a horizontal swipe gesture to scroll element 406 to move the scroll element to a second position. For example, the second position can include scroll element 406 positioned to align function symbol 420 with indicator 412, as illustrated in FIG. 4B. In other words, after the scroll element 406 has stopped at the right end position (e.g., a first position), a user can provide an additional horizontal swipe gesture (e.g., right-to-left swipe gesture) to move function symbol 420 towards or into alignment with indicator 412 (e.g., a second position). Therefore, while viewing digital content 408, a user can provide an additional swipe gesture to scroll element 406 to easily and quickly activate a camera function of computing device 400.

The particular user interaction that a user can provide to scroll element 406 to activate a function can vary from one embodiment to the next. For example, instead of a user providing an additional horizontal swipe gesture to scroll element 406 to activate a function, as described above, in one or more embodiments a user can provide a tap gesture with respect to function symbol 420 to activate a function. Alternatively, in one or more embodiments, a user can provide a touch and drag gesture with respect to function symbol 420, whereby a user drags function symbol 420 into view area 404.

In one or more embodiments, scroll element controller 106 can cause scroll element 406 to not stop at the end position of scroll element 406, but rather continue directly to align function symbol 420 with indicator 412 and activate a camera function of computing device 400. Accordingly, a user can activate a camera function of computing device 400 without having to provide an additional user interaction after scroll element 406 reaches the end position.

In one or more embodiments, once user input detector 104 detects a particular user interaction associated with activating a function, system 100 directly activates the function on computing device 100. For example, upon selection of function symbol 420 or upon function symbol 420 aligning with indicator 412, system 100 causes computing device 400 to launch a camera application. In some example embodiments, launching a camera application includes launching a separate stand-alone camera application. For example, a user can open a separate camera application easily and quickly from within the user interface provided by system 100 using one or more of the features and processes described above.

Alternatively, in some embodiments, when function symbol 420 is aligned with indicator 412, user interface provider 102 can provide shortcut icon 422 within view area 404. For example, FIG. 4B illustrates that user interface provider 102 can provide shortcut icon 422 that corresponds to a camera function of computing device 400. A user can interact with shortcut icon 422 to activate a camera function of computing device 400. For example, a user can provide a tap gesture with respect to shortcut icon 422 that causes computing device 400 to activate a camera function.

In one or more embodiments, a camera function can be incorporated within the user interface provided by system 100. For example, FIGS. 4C and 4D illustrate an example embodiment where user interface provider 102 can present a camera function within the user interface used to navigate digital content 408. In particular, FIG. 4C illustrates an example user interface in an intermediate position of activating a camera function of computing device 400. As illustrated in FIG. 4C, user interface provider 102 can cause a camera viewfinder display 424 to scroll into view area 404 as a user provides a horizontal swipe gesture to scroll element 406 to move function symbol 420 towards alignment with indicator 412. As shown in FIG. 4C, for example, camera viewfinder display 424 can scroll up from the bottom of view area 404 such that camera viewfinder 424 appears as part of a grid that organizes the digital content (e.g., see FIG. 2). In one or more alternative embodiments, however, the camera viewfinder display 424 can scroll into view area 404 from any side of view area 404.

In some embodiments, as camera viewfinder display 424 scrolls into view area 404, digital content 408 can scroll out of view area 404. For example, and as illustrated in FIG. 4C, digital content 408 can scroll out of view area 404 as camera viewfinder 424 scrolls into view area 404. In alternative embodiments, camera viewfinder 424 can simply scroll into view area 404 and appear to slide over digital content 408.

FIG. 4D illustrates an example of camera viewfinder 424 integrated within a user interface provided by system 100. As shown, camera viewfinder 424 can encompass the entire view area 404. As further illustrated in FIG. 4D, camera viewfinder 424 can include various camera controls 428. For example, camera controls 428 can include a switch camera control (e.g., switch between a front and a back camera on computing device 400), a mode control (e.g., light modes, action modes), a video control, a flash control, and a capture control. A user can interact with camera controls 428 within the user interface to control the camera function of computing device 400, and to ultimately capture a digital photo.

Due to the camera viewfinder's 424 integration within the user interface provided by system 100, user interface provider 102 can continue to provide scroll element 406 within the user interface. For example, as illustrated in FIG. 4D, scroll element 406 remains part of the user interface below camera viewfinder 424. In this way, a user can interact with scroll element 406 to exit the camera function and return to viewing digital content 408. For instance, when a camera function is activated, as illustrated in FIG. 4D, a user can provide a horizontal swipe gesture with respect to scroll element 406 in a direction to move function symbol 420 away from indicator 412 (e.g., a left-to-right swipe gesture). Upon a user providing the horizontal swipe gesture, scroll element 406 can move to align marker 416 with indicator 412 (e.g., return to the first position).

In response to the user providing a user interaction to align marker 416 with indicator 412, camera viewfinder 424 can scroll out of view area 404 while digital content 408 scrolls into view area 404. In other words, to exit the camera function, user interface provider 102 can simply reverse the process by which the camera function activates. In the event that a camera function is in a separate application, a user can return to system 100 by pressing a back button on computing device 400. In one or more embodiments, system 100 may provide an icon within a separate camera application with which a user can interact to return to view digital content 408.

Although FIGS. 4A-4D are explained with reference to a user providing one or more user interactions with respect to scroll element 406 to activate a function, in one or more embodiments, a user can also interact with view area 404 to activate a function. For example, upon a user scrolling to the end of digital content 408 (e.g., see FIG. 4A), a user can provide one or more user interactions to view area 404 to activate a function. For example, a user can provide a vertical swipe gesture (e.g., an upward swipe gesture) with respect to the view area 404 at an end position of digital content 408. In response to the vertical swipe gesture, system 100 can activate a camera function as described above.

Figure 5B:
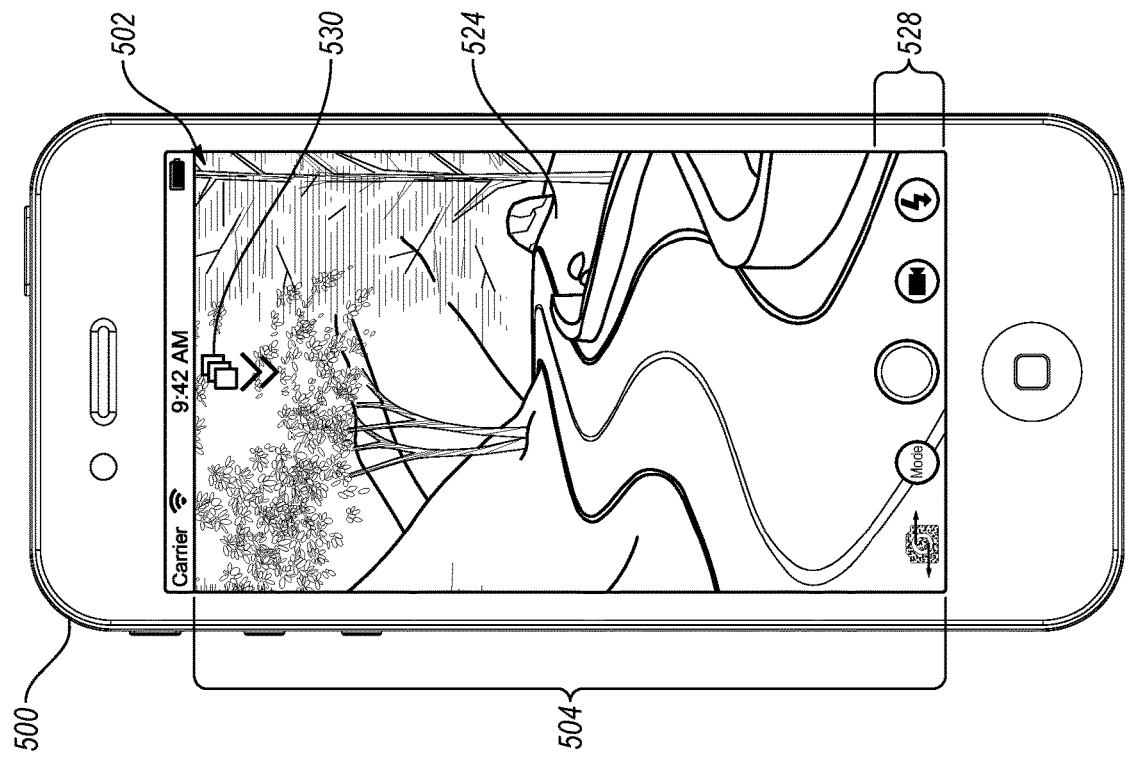
FIGS. 5A-5B illustrate another graphical user interface that allows a user to activate a function in accordance with one or more embodiments.
Figure 5A:
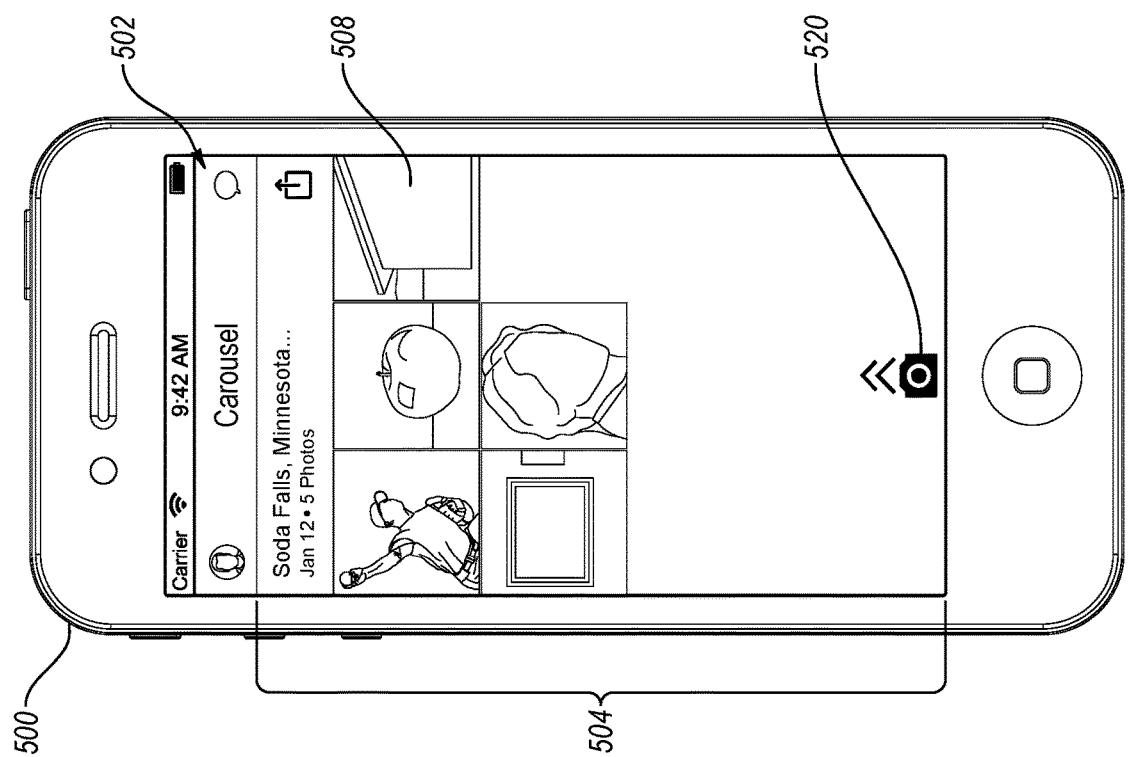

In addition, one or more embodiments of system 100 can incorporate a user interface that does not include a scroll element. For example, FIGS. 5A-5B illustrate an example embodiment of system 100 that allows a user to quickly activate a function without the use of a scroll element. Similar to the preceding figures, FIGS. 5A-5B illustrate a computing device 500 that includes a touch screen 502 presenting a user interface having a view area 504 and digital content 508.

Furthermore, FIG. 5A illustrates that a user has scrolled to an end portion within digital content 508. Upon reaching an end portion within digital content 508, user interface provider 102 can provide a function symbol 520. For example, as FIG. 5A shows, user interface provider 102 can provide function symbol 520 proximate the bottom of view area 504. Function symbol 520 can indicate to a user that an additional user interaction can activate a function associated with function symbol 520. For instance, function symbol 520 can include a symbol of a camera and one or more arrows that indicate a scroll direction, as illustrated in FIG. 5A.

In some embodiments, similar to the navigation functions discussed above, as a user reaches the end of digital content 508 within view area 504, the navigation of the user may initially be stopped prior to allowing the user to activate the camera function. For example, as the navigation may stop at and/our bounce back to the view shown in FIG. 5A prior to allowing the user to continue to navigate beyond the end of digital content 508.

To activate a camera function, a user can provide a vertical swipe gesture in an upward direction anywhere within view area 504. In response to the vertical swipe gesture, system 100 can cause computing device 500 to activate a camera function and user interface provider 102 can present camera view finder 524, as illustrated in FIG. 5B. In one or more alternative embodiments, a user interaction can be directed at function symbol 520 to activate the camera function. For instance, a user can activate the camera function by providing a tap gesture or a vertical swipe gesture directed at function symbol 520.

Once the camera function is activated, as illustrated in FIG. 5B, camera viewfinder 524 can include various camera controls 528 with which a user can interact to control the camera and ultimately capture a digital photograph. For example, camera controls 528 can include a switch camera control (e.g., switch between a front and a back camera on computing device 500), a mode control (e.g., light modes, action modes), a video control, a flash control, and a capture control.

Additionally, FIG. 5B illustrates that user interface provider 102 can provide digital content symbol 530 that directs how a user can exit the camera function and return to viewing digital content 508. For example, as illustrated in FIG. 5B digital content symbol 530 can have a location proximate the top of view area 504. Alternatively, digital content symbol can have a location anywhere within view area 504. For example, digital content symbol 528 can have a location next to camera controls 528.

As illustrated in FIG. 5B, digital content symbol 528 can include an indication of a user interaction that a user can provide relative to view area 504 to exit the camera function. For example, and as illustrated in FIG. 5B, digital content symbol 530 can include direction arrows that indicate a direction of a user interaction to gain access to digital content 508. For instance, digital content symbol 530 can indicate to a user to provide a vertical swipe gesture in the downward direction within view area 504 to gain access to digital content 508 directly from camera viewfinder 524, as illustrated in FIG. 5B. Thus, when using a camera function, a user can provide one or more user interactions anywhere within view area 504 to exit out of the camera viewfinder 524 and return to viewing digital content 508.

As discussed above with respect to a scroll element, one or more embodiments can activate a function from each of the ends of a scroll element. In one example embodiment, the function activated can be the same function. For example, a user can interact with a scroll element at either end of a scroll element to activate a camera function of a computing device. Alternatively, each end of a scroll element can activate a different function. For example, a right end of a scroll element can activate a camera function, while a left end of scroll element activates a different function.

FIGS. 6A and 6B illustrate an example of a function that a user can activate from a left end of a scroll element. Similar to the previously described figures, FIGS. 6A-6B illustrate computing device 600 that includes touch screen 602 presenting a user interface having view area 604, scroll element 606, and digital content 608. Along similar lines as described above with respect to a right end of a scroll element, a left end of scroll element 606 can also use one or more factors to determine how to label a mark associated with the left end of scroll element 606. For example, FIG. 6A illustrates that upon reaching the left end of scroll element 606, user interface provider 102 can label marker 616, which is overlapping indicator 612, with the year associated with the digital content corresponding to marker 616.

As with the "Today" label above, user interface provider 102 can recognize that marker 616 is located on the left end of scroll element 606, and therefore, provide the year instead of the month. Alternatively, user interface provider 102 can provide the month, or the month and year. In yet a further embodiment, the user interface provider 102 can provide a label, such as, "Start—Year," to further visually indicate that the marker 616 is the start of digital content.

As further illustrated in FIG. 6A, user interface provider can present marker 620 associated with digital content that is not associated with, or that does not otherwise include, date information. For example, a collection of digital photos may include one or more photos that do not have date information included in the digital photo metadata. As illustrated in FIG. 6A, user interface provider 102 can position the digital content that does not include date information on one end of the grid (e.g., prior to the oldest known digital content), and therefore, user interface provider 102 can provide marker 620 within scroll element 606 (e.g., prior to the start of the timeline).

As described above with a camera function, upon reaching the left end (e.g., when marker 616 aligns with indicator 612) scroll element 606 can stop. Furthermore, and similar to as described above, when scroll element 606 is positioned at the left end, a user can provide one or more user interactions directed at scroll element 606 to access the digital content that is not associated with date information. For example, a user can provide a horizontal swipe gesture (e.g., left-to-right swipe gesture) to scroll element 606 to access digital content that is not associated with date information.

In particular, and as illustrated in FIG. 6B, upon a user providing a horizontal swipe gesture directed at scroll element 606, scroll element 606 can move to have marker 620 align with indicator 612. In addition, the user interface provider 102 can provide digital content 608 that is not associated with date information within view area 604, as further illustrated in FIG. 6B. At this point, a user can continue to provide one or more user interactions directed at scroll element 606, or alternatively view are 604, to scroll through digital content 608 that is not associated with date information. Thus, in some embodiments, system 100 provides a camera activation function at one end of a scroll element, and access to digital content that is not associated with date information at the other end of a scroll element.

Figure 7:
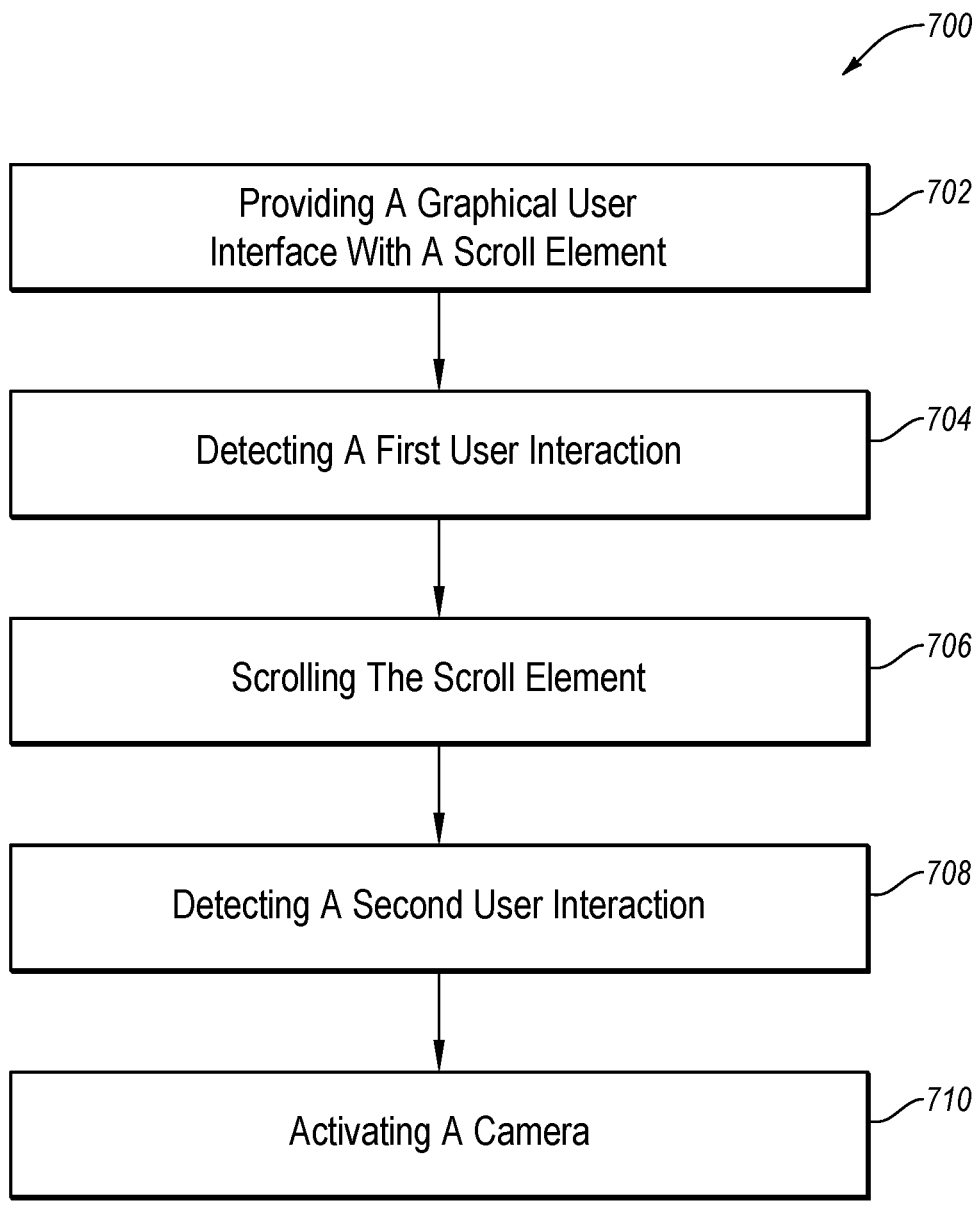
FIG. 7 illustrates a flowchart of a series of acts in a method of activating a camera of a computing device according to one or more embodiments.
Figure 8:
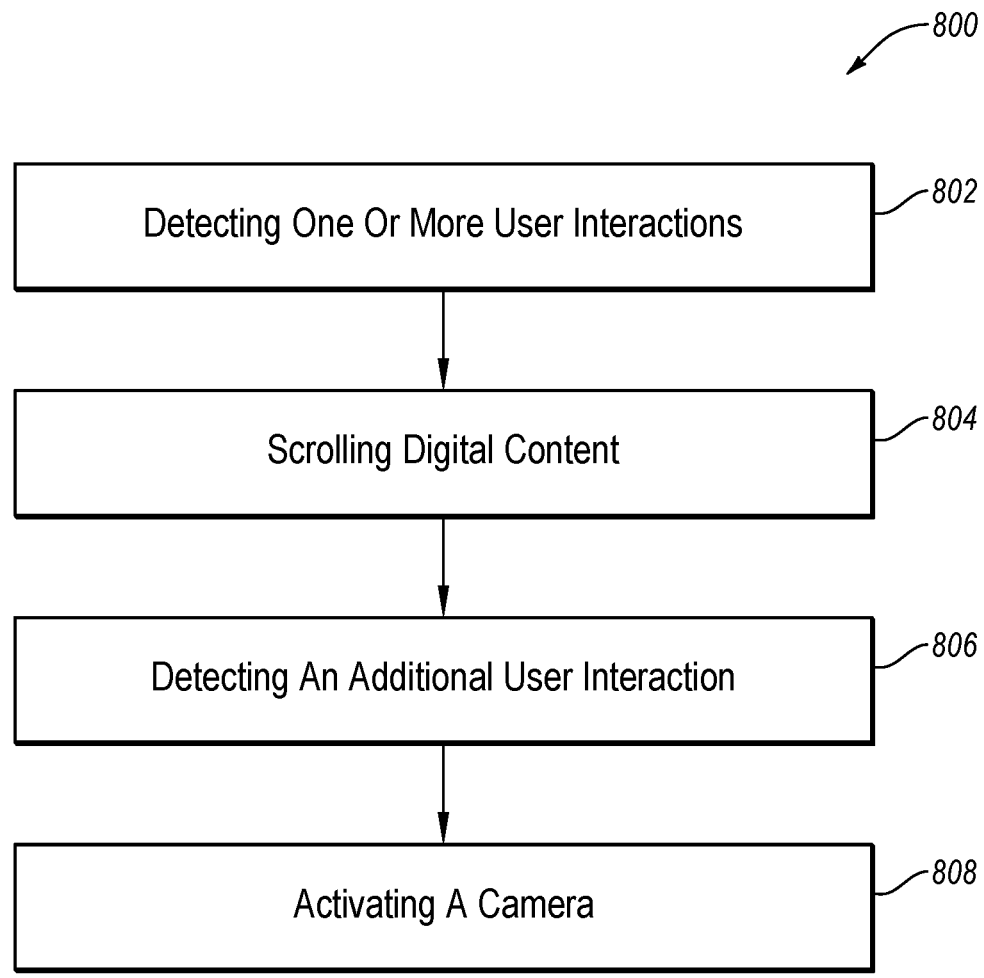
FIG. 8 illustrates a flowchart of a series of acts in another method of activating a camera of a computing device according to one or more embodiments.

FIGS. 1-6B, the corresponding text, and the examples, provide a number of different systems, devices, and features for navigating and browsing through a collection of digital content and activating one or more functions. In addition to the foregoing, one or more embodiments can also be described in terms of flowcharts comprising acts and steps in a method for accomplishing a particular result. For example, FIGS. 7 and 8 illustrate flowcharts of exemplary methods in accordance with one or more embodiments. The methods described in relation to FIGS. 7 and 8 may be performed with less or more steps/acts or the steps/acts may be performed in differing orders. Additionally, the steps/acts described herein may be repeated or performed in parallel with one another or in parallel with different instances of the same or similar steps/acts.

FIG. 7 illustrates a flowchart of one example method 700 of activating a camera function. The method 700 includes an act 702 of providing a graphical user interface with a scroll element. For example, act 702 can include providing a graphical user interface on a computing device, the graphical user interface including a scroll element that allows a user to scroll digital content through a view area. In addition, act 702 can include providing an indicator within the graphical user interface that indicates a position of the scroll element. For example, act 702 can also include providing markers positioned on the scroll element, wherein the markers correspond to the organization of the digital content. In one or more embodiments, act 702 can include labeling one or more of the markers with at least a portion of a date that corresponds to the digital content.

In addition, method 700 further includes an act 704 of detecting a first user interaction. In particular, act 704 can include detecting, by at least one processor, a first user interaction relative to the scroll element. For example, in one or more embodiments the first user interaction is a horizontal swipe gesture. In addition, act 704 can include scrolling digital content through the view area in response to the first user interaction.

Method 700 can additionally include an act 706 of scrolling the scroll element. In particular, act 706 can include scrolling, in response to the first user interaction, the scroll element to a first position of the scroll element. For example, act 706 can include providing a function symbol within the scroll element when the scroll element is in the first position.

Furthermore, the method 700 can also include an act 708 of detecting a second user interaction. In particular, act 708 can include detecting, by the at least one processor, a second user interaction relative to the scroll element when the scroll element is in the first position. For example, in one or more embodiments the second user interaction is a horizontal swipe gesture. In addition, act 708 can include scrolling the scroll element 406 to a second position in response to detecting the second user interaction relative to the scroll element 406. Furthermore, act 708 can include aligning the function symbol within the scroll element with the indicator when the scroll element is in the second position.

Moreover, the method 700 can include an act 710 of activating a camera. In particular, act 710 can include activating a camera of the computing device in response to detecting the second user interaction relative to the scroll element. For example, act 710 can include providing a camera viewfinder and at least one camera control element within the graphical user interface. In particular, the camera viewfinder can be provided within the view area of the graphical user interface.

Referring now to FIG. 8, a flowchart of another example method 800 activating a camera is illustrated. As shown, method 800 can include an act 802 of detecting one or more user interactions. In particular, act 802 can include detecting, by at least one processor, one or more user interactions with respect to a portion of a graphical user interface presented on a computing device. For example, the portion of the graphical user interface can be a view area. Alternatively, the portion of the graphical user interface can be a scroll element.

The method 800 can also include an act 804 of scrolling digital content. In particular, act 804 can include scrolling, in response to the one or more user interactions, digital content to an end position of the digital content. For example, digital content can scroll through the view area in response to a user providing one or more user interactions with respect to the portion of the graphical user interface.

Additionally, the method 800 can include an act 806 of detecting an additional user interaction. In particular, act 806 can include detecting, by the at least one processor, an additional user interaction with respect to the portion of a graphical user interface when the digital content is in the end position. For example, the additional user interaction can be a swipe gesture. In one example, the swipe gesture is a horizontal swipe gesture. Alternatively, the swipe gesture is a vertical swipe gesture.

Furthermore, the method 800 can include an act 808 of activating a camera. In particular, act 808 can include activating a camera of the computing device upon detecting the additional user interaction. For example, activating the camera of a computing device can include providing a camera viewfinder within the graphical user interface.

In addition, method 800 can include an act of detecting a third user interaction with respect to the portion of the graphical user interface when the camera viewfinder is provided within the graphical user interface. For example, method 800 can include deactivating the camera of the computing device upon detecting the third user interaction.

Figure 9:
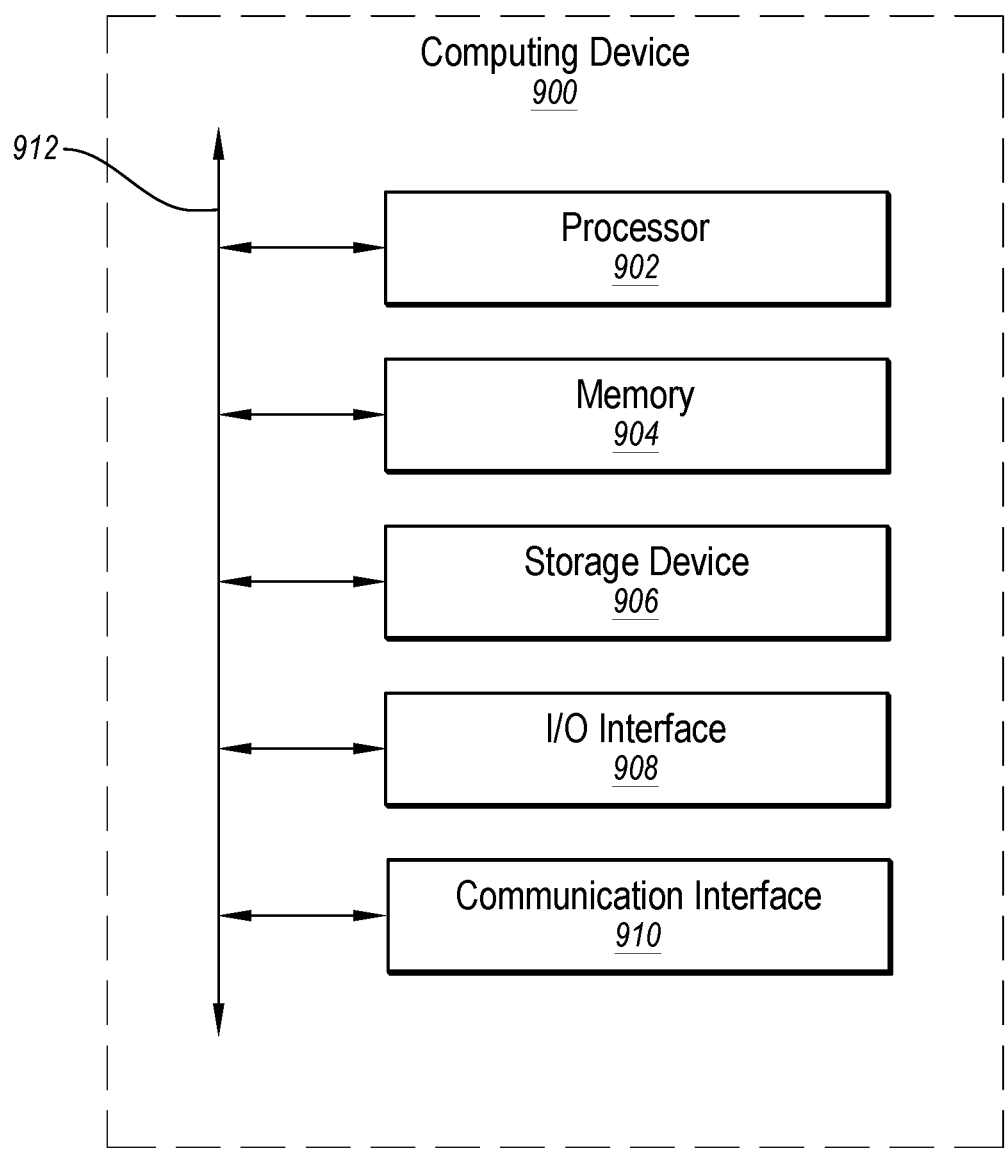
FIG. 9 illustrates a block diagram of a computing device according to one or more embodiments.

FIG. 9 illustrates, in block diagram form, an exemplary computing device 900 that may be configured to perform one or more of the processes described above. In particular, the computing devices 200, 300, 400, 500, and 600 can comprise the components of computing device 900. As shown by FIG. 9, the computing device can comprise a processor 902, a memory 904, a storage device 906, an I/O interface 908, and a communication interface 910, which may be communicatively coupled by way of communication infrastructure 912. While an exemplary computing device 900 is shown in FIG. 9, the components illustrated in FIG. 9 are not intended to be limiting. Additional or alternative components may be used in other embodiments. Furthermore, in certain embodiments, computing device 900 can include fewer components than those shown in FIG. 9.

Components of computing device 900 shown in FIG. 9 will now be described in additional detail.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage device 906 and decode and execute them. In particular embodiments, processor 902 may include one or more internal caches for data, instructions, or addresses. As an example and not by way of limitation, processor 902 may include one or more instruction caches, one or more data caches, and one or more translation lookaside buffers (TLBs). Instructions in the instruction caches may be copies of instructions in memory 904 or storage device 906.

Memory 904 may be used for storing data, metadata, and programs for execution by the processor(s). Memory 904 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 904 may be internal or distributed memory.

Storage device 906 includes storage for storing data or instructions. As an example and not by way of limitation, storage device 906 can comprise a non-transitory storage medium described above. Storage device 906 may include a hard disk drive (HDD), a floppy disk drive, flash memory, an optical disc, a magneto-optical disc, magnetic tape, or a Universal Serial Bus (USB) drive or a combination of two or more of these. Storage device 906 may include removable or non-removable (or fixed) media, where appropriate. Storage device 906 may be internal or external to computing device 900. In particular embodiments, storage device 906 is non-volatile, solid-state memory. In other embodiments, Storage device 906 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 908 allows a user to provide input to, receive output from, and otherwise transfer data to and receive data from computing device 900. I/O interface 908 may include a mouse, a keypad or a keyboard, a touch screen, a camera, an optical scanner, network interface, modem, other known I/O devices or a combination of such I/O interfaces. I/O interface 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interface 908 is configured to provide graphical data to a display for presentation to a user. The graphical data may be representative of one or more graphical user interfaces and/or any other graphical content as may serve a particular implementation.

Communication interface 910 can include hardware, software, or both. In any event, communication interface 910 can provide one or more interfaces for communication (such as, for example, packet-based communication) between computing device 900 and one or more other computing devices or networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 910 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 910 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Communication infrastructure 912 may include hardware, software, or both that couples components of computing device 900 to each other. As an example and not by way of limitation, communication infrastructure 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 10:
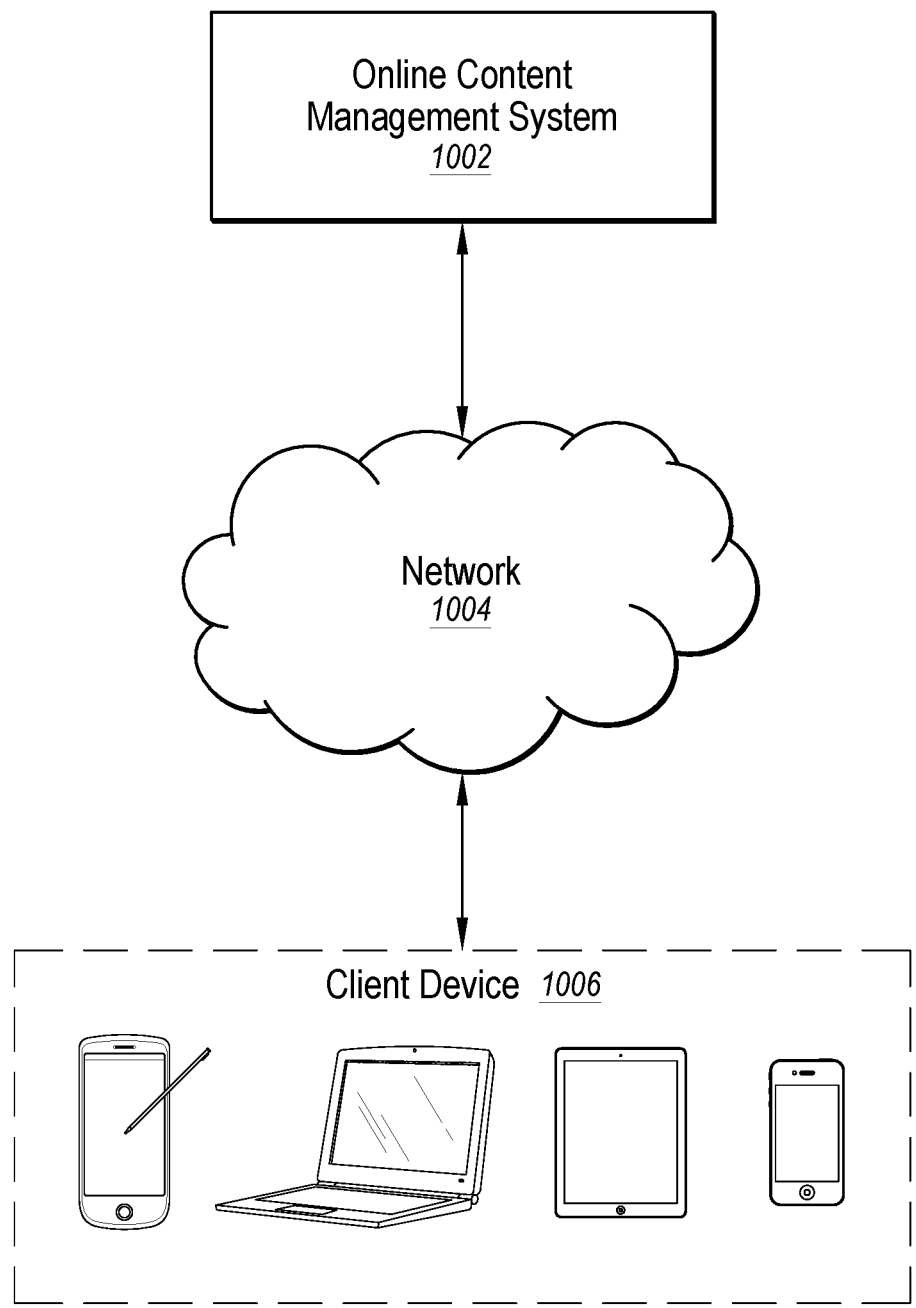
FIG. 10 illustrates a network environment of an online content management system according one or more embodiments.

FIG. 10 is a schematic diagram illustrating an environment within which one or more embodiments of content management system 100 can be implemented. Online content management system 1002 may generate, store, manage, receive, and send digital content. For example, online content management system 1002 may send and receive digital content to and from client devices 1006 by way of network 1004. In particular, online content management system 1002 can store and manage a collection of digital content. Online content management system 1002 can manage the sharing of digital content between computing devices associated with a plurality of users. For instance, online content management system 1002 can facilitate a user sharing a digital content with another user of online content management system 1002.

In particular, online content management system 1002 can manage synchronizing digital content across multiple client devices 1006 associated with one or more users. For example, a user may edit digital content using client device 1006. The online content management system 1002 can cause client device 1006 to send the edited digital content to online content management system 1002. Online content management system 1002 then synchronizes the edited digital content on one or more additional computing devices.

In addition to synchronizing digital content across multiple devices, one or more embodiments of online content management system 1002 can provide an efficient storage option for users that have large collections of digital content. For example, online content management system 1002 can store a collection of digital content on online content management system 1002, while the client device 1006 only stores reduced-sized versions of the digital content. A user can navigate and browse the reduced-sized versions (e.g., a thumbnail of a digital photo) of the digital content on client device 1006. In particular, one way in which a user can experience digital content is to browse the reduced-sized versions of the digital content on client device 1006.

Another way in which a user can experience digital content is to select a reduced-size version of digital content to request the full-size version of digital content from online content management system 1002. In particular, upon a user selecting a reduced-sized version of digital content, client device 1006 sends a request to online content management system 1002 requesting the digital content associated with the reduced-sized version of the digital content. Online content management system 1002 can respond to the request by sending the digital content to client device 1006. Client device 1002, upon receiving the digital content, can then present the digital content to the user. In this way, a user can have access to large collections of digital content while minimizing the amount of resources used on client device 1006.

Client device 1006 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. Client device 1006 may execute one or more client applications, such as a web browser (e.g., Microsoft Windows Internet Explorer, Mozilla Firefox, Apple Safari, Google Chrome, Opera, etc.) or a native or special-purpose client application (e.g., Facebook for iPhone or iPad, Facebook for Android, etc.), to access and view content over network 1004.

Network 1004 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 1006 may access online content management system 1002.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:
providing a graphical user interface for displaying digital content within a view area;
detecting a first swipe gesture with respect to the view area;
in response to the first swipe gesture, activating a camera function by displaying a camera viewfinder within the graphical user interface;
providing a digital content function icon within the graphical user interface along with the camera viewfinder, wherein the digital content function icon comprises an indication of a direction of a second swipe gesture originating from the digital content function icon;
while displaying the camera viewfinder within the graphical user interface, detecting the second swipe gesture originating from the digital content function icon and in the direction indicated by the digital content function icon; and
in response to the second swipe gesture originating from the digital content function icon and in the direction indicated by the digital content function icon, removing the camera viewfinder from display within the graphical user interface and displaying the digital content within the view area.

2. The method of claim 1, wherein:
the first swipe gesture is an upward vertical swipe gesture with respect to the graphical user interface; and
the second swipe gesture is a downward vertical swipe gesture originating from the digital content function icon within the graphical user interface.

3. The method of claim 1, further comprising providing, within the graphical user interface and while displaying the camera viewfinder, a plurality of camera controls comprising at least one of a video control, a switch between front and back camera control, a lighting control, or a flash control.

4. The method of claim 1, further comprising:
receiving an indication of a user interaction with a capture control element displayed in combination with the camera viewfinder;
capturing new digital content based on detecting the indication of the user interaction with the capture control element; and
wherein, based on the second swipe gesture, returning to displaying the digital content within the view area comprises providing, for display in the view area, the new digital content.

5. The method of claim 1, wherein:
providing a graphical user interface for displaying digital content within a view area comprises displaying the digital content within the view area in a first client application; and
activating the camera function comprises displaying the camera viewfinder in a second client application.

6. The method of claim 1, further comprising:
detecting, while displaying the digital content within the view area, a third swipe gesture with respect to the view area; and
based on the third swipe gesture, scrolling the digital content through the view area.

7. A system comprising:
at least one processor; and
at least one non-transitory computer readable storage medium storing instructions thereon that, when executed by the at least one processor, cause a computing device to:
provide a graphical user interface for displaying digital content within a view area;
receive an indication of a first interaction with respect to the view area, wherein the first interaction is a first swipe gesture;
activate a camera function by displaying a camera viewfinder within the graphical user interface in response to the first interaction;
provide a digital content function icon within the graphical user interface along with the camera viewfinder, wherein the digital content function icon comprises an indication of a direction of a second swipe gesture originating from the digital content function icon;

while displaying the camera viewfinder within the graphical user interface, receive an indication of a second interaction, wherein the second interaction is the second swipe gesture originating from the digital content function icon and in the direction indicated by the digital content function icon; and remove the camera viewfinder from display within the graphical user interface and display the digital content within the view area in response to the second swipe gesture originating from the digital content function icon and in the direction indicated by the digital content function icon.

8. The system of claim 7, wherein:
the first interaction is a swipe gesture in a first direction with respect to a function symbol icon displayed in the view area; and
the second interaction is a swipe gesture in a second direction originating from the digital content function icon that is different than the first direction.

9. The system of claim 8, wherein:
the first direction is an upward vertical direction; and
the second direction is a downward vertical direction with respect to the digital content function icon.

10. The system of claim 7, wherein the first interaction is made with respect to a camera function symbol.

11. The system of claim 7, further comprising instructions that, when executed by the at least one processor, cause the computing device to provide, within the graphical user interface and while displaying the camera viewfinder, a plurality of camera controls comprising at least one of a video control, a switch between front and back camera control, a lighting control, or a flash control.

12. The system of claim 7, further comprising instructions that, when executed by the at least one processor, cause the computing device to capture new digital content while the camera viewfinder is activated.

13. The system of claim 12, further comprising instructions that, when executed by the at least one processor, cause the computing device to display the new digital content based on returning to displaying the digital content within the view area based on the second interaction.

14. A non-transitory computer readable storage medium storing instructions thereon that, when executed by at least one processor, cause a computing device to:
provide a graphical user interface for displaying digital content within a view area;
receive an indication of a first interaction with respect to the view area, wherein the first interaction is a first swipe gesture;
provide a camera viewfinder for display within the graphical user interface in response to the first interaction;
provide a digital content function icon within the graphical user interface along with the camera viewfinder, wherein the digital content function icon comprises an indication of a direction of a second swipe gesture originating from the digital content function icon;
while displaying the camera viewfinder within the graphical user interface, receive an indication of a second interaction, wherein the second interaction is the second swipe gesture originating from the digital content function icon and in the direction indicated by the digital content function icon; and
remove the camera viewfinder from display within the graphical user interface and display the digital content within the view area in response to the second swipe gesture originating from the digital content function icon and in the direction indicated by the digital content function icon.

15. The non-transitory computer readable storage medium of claim 14, wherein:
the first interaction is a swipe gesture in a first direction; and
the second interaction originating from the digital content function icon is a swipe gesture in a second direction that is different than the first direction.

16. The non-transitory computer readable storage medium of claim 15, wherein:
the first direction is an upward vertical direction; and
the second direction is a downward vertical direction with respect to the digital content function icon.

17. The non-transitory computer readable storage medium of claim 14, wherein:
the first interaction is made with respect to a camera function symbol.

18. The non-transitory computer readable storage medium of claim 14, further comprising instructions that, when executed by the at least one processor, cause the computing device to provide, within the graphical user interface and while displaying the camera viewfinder, a plurality of camera controls comprising at least one of a video control, a switch between front and back camera control, a lighting control, or a flash control.

19. The non-transitory computer readable storage medium of claim 18, further comprising instructions that, when executed by the at least one processor, cause the computing device to capture new digital content while the camera viewfinder is activated.

20. The non-transitory computer readable storage medium of claim 19, further comprising instructions that, when executed by the at least one processor, cause the computing device to display the new digital content based on returning to displaying the digital content within the view area based on the second interaction originating from the digital content function icon.

\* \* \* \* \*